United States Patent [19]

Katayama et al.

[11] Patent Number: 4,638,227
[45] Date of Patent: Jan. 20, 1987

[54] METHOD AND APPARATUS FOR RECOVERING NORMALITY IN MOVING SEQUENCE OF MACHINERY

[75] Inventors: Masanori Katayama, Niihari; Norihisa Komoda, Kawasaki; Tomohiro Murata, Ebina; Kazuo Kera, Hitachi, all of Japan

[73] Assignee: Hitachi, Ltd., Tokyo, Japan

[21] Appl. No.: 691,910

[22] Filed: Jan. 16, 1985

[30] Foreign Application Priority Data

Jan. 18, 1984 [JP] Japan .................................. 59-5577
Feb. 1, 1984 [JP] Japan ................................ 59-15188
Apr. 11, 1984 [JP] Japan ................................ 59-70853

[51] Int. Cl.⁴ ...................... G05B 23/02; G05B 19/00
[52] U.S. Cl. .................................... 318/565; 318/568; 364/184
[58] Field of Search .............. 318/565, 568, 567, 569, 318/563; 364/184, 167, 148, 191, 193, 474

[56] References Cited

U.S. PATENT DOCUMENTS

| | | | |
|---|---|---|---|
| 3,802,622 | 4/1974 | Nishimura | 318/567 X |
| 3,889,105 | 6/1975 | Schneekloth | 318/568 X |
| 4,163,930 | 8/1979 | Lachaussee | 318/565 X |
| 4,347,578 | 8/1982 | Inaba | 318/568 X |
| 4,379,335 | 4/1983 | Kirsch | 318/568 X |
| 4,471,279 | 9/1984 | Inaba | 318/565 |
| 4,490,660 | 12/1984 | Tsuchihashi | 318/568 X |
| 4,496,889 | 1/1985 | Fukuyama | 318/565 |
| 4,550,378 | 10/1985 | Nozawa | 318/565 |

OTHER PUBLICATIONS

Masuda, Ryosuke and Kensuke Hasegawa, "Mark Flow Graph and Its Application to Complex Sequential Control System", Report #1115, 13th Hawaii Int. Conference on System Sciences, vol. 1, 1980, pp. 194–203.
Murata, Tomohiro and Norihasa Komoda et al., "A Petri-Net Based FA Controller for Flexible and Maintainable Control Specifications", Report #1314, IECON, 1984, pp. 362–366.

Primary Examiner—William M. Shoop, Jr.
Assistant Examiner—Patrick C. Keane
Attorney, Agent, or Firm—Antonelli, Terry & Wands

[57] ABSTRACT

In order to execute a series of moving sequences by synchronous and exclusive control of unit operations taught or programed in advance, there are provided a first storing of the relationship of the sequence of execution of each unit operation to other unit operations to be controlled synchronously or exclusively; a second storing of information relating to the operational status of each unit operation; and a third storing of operating instructions for executing each unit operation. When machine tools have stopped due to the occurrence of an abnormality while a series of unit operations are being executed by the operating instructions stored in the third storing means, a unit operation for restarting on the basis of the relationship of the executing sequence stored during the first storing is appointed, and information concerning the operational status stored during the second storing is corrected. Furthermore, at the time when a junction operation in which there exist two or more sequences leading to a unit operation has been executed, a fourth storing is effected during the normal state of the operation steps relating to that execution. Then the content of the information stored during said second storing is corrected to a state permitting restarting from an appointed unit operation by referring to information stored during the fourth storing.

4 Claims, 31 Drawing Figures

FIG. 3
(PRIOR ART)

| SYN/EXD STEP | COMPLETION STAND-BY OPERATION Nō | | EXECUTE STAND-BY OPERATION Nō | |
|---|---|---|---|---|
| 1 | 100 | 112 | 101 | |
| 2 | 101 | 109 | 103 | |
| 3 | 103 | | 104 | |
| 4 | 106 | | 109 | 110 |
| 5 | 107 | | 109 | 111 |
| 6 | 110 | | 113 | |
| 7 | 111 | | 113 | |

FIG. 4
(PRIOR ART)

| OPERATION Nō | EXECUTE MANAGEMENT STATUS (a) | OPERATION STATUS (b) | MESSAGE Nō |
|---|---|---|---|
| 100 | 0 | 1 | 6 |
| 101 | 0 | 1 | 7 |
| 102 | 0 | 1 | 8 |
| 103 | 0 | 1 | 1 |
| 104 | 0 | 1 | 2 |
| 105 | 0 | 1 | 9 |
| 106 | 0 | 1 | 3 |
| 109 | 1 | 1 | 10 |
| 113 | 1 | 2 | 11 |

| MESSAGE No | CONTROL INFORMATION | | DESTINATION |
|---|---|---|---|
| 1 | $i_1$ | $j_1$ | HANDLING ROBOT |
| 2 | $i_2$ | $j_2$ | HANDLING ROBOT |
| 3 | $i_3$ | $j_3$ | HANDLING ROBOT |
| 4 | $i_4$ | $j_4$ | SCREWING ROBOT |
| 5 | $i_5$ | $j_5$ | SCREWING ROBOT |

$i_m$ : EXECUTE PROGRAM No $j_n$ : OPERATION PARAMETER No

FIG. 12

| OPERATION Nō | EXECUTION MANAGEMENT STATUS (a) | OPERATION STATUS (b) | MESSAGE Nō | JUNCTION OPERATION (c) |
|---|---|---|---|---|
| 100 | 0 | 1 | 6 | 0 |
| 101 | 0 | 1 | 7 | 0 |
| 102 | 0 | 1 | 8 | 0 |
| 103 | 0 | 1 | 1 | 0 |
| 104 | 0 | 1 | 2 | 0 |
| 105 | 0 | 1 | 9 | 0 |
| 106 | 0 | 1 | 3 | 0 |
| 109 | 1 | 1 | 10 | 1 |
| 113 | 1 | 2 | 11 | 1 |

FIG. 13

| SYNC/EXCL STEP | JUNCTION OPERATION Nō |
|---|---|
| 5 | 109 |
| 8 | 113 |
| 4 | 109 |
| 6 | 113 |
| | |
| | |
| | |

FIG. 14

| SYNC/EXCL STEP |
|---|
| 4 |
| 6 |
| |
| |
| |
| |

FIG. 20

| SYNC/EXCL STEP | COMPLETION STAND-BY OPERATION Nō | | | EXECUTE STAND-BY OPERATION Nō | | | TRANSITION Nō |
|---|---|---|---|---|---|---|---|
| 1 | 112 | | | 113 | | | 1 |
| 2 | 101 | 114 | 122 | 116 | | | 2 |
| 3 | 133 | 116 | | 118 | | | 1 |
| 4 | 118 | | | 133 | | | 3 |

| OPERATION Nō | EXECUTE MANAGEMENT STATUS (201) | OPERATION STATUS (202) | MESSAGE Nō |
|---|---|---|---|
| 101 | 1 | 1 | 2 |
| 112 | 1 | 1 | 3 |
| 113 | 1 | 1 | 1 |
| 116 | 1 | 2 | 4 |
| 122 | 0 | 1 | 5 |

| TRANSITION Nō | TRANSITION CONDITION LOGIC FORMULA (203) | TRANSITION STATUS (204) |
|---|---|---|
| 1 | 11 AND 12 | 0 |
| 2 | 13 AND 24 | 1 |
| 3 | 31 AND 32 | 0 |
| 4 | 41 AND 42 | 0 |

| EXTERNAL CONTACTS No | PRESENT EXTERNAL CONTACTS STATUS (205) | STATUS MONITORING FLAG (208) |
|---|---|---|
| 11 | 0 | 1 |
| 12 | 0 | 0 |
| 13 | 1 | 0 |
| 14 | 1 | 1 |

| MESSAGE No | CONTROL INFORMATION (206) | | DESTINATION (207) |
|---|---|---|---|
| 1 | $i_1$ | $j_1$ | ROBOT 1 |
| 2 | m | | WORKING MACHINE 1 |
| 3 | $i_2$ | $j_2$ | ROBOT 2 |
| 4 | $i_3$ | $j_3$ | ROBOT 1 |

| EXTERNAL CONTACTS NO | CHANGE TO ON STATUS | | | CHANGE TO OFF STATUS | | |
|---|---|---|---|---|---|---|
| | RELATIONAL OPERATION NO | OPERATION STATUS | TIMES | RELATIONAL OPERATION NO | OPERATION STATUS | TIMES |
| 11 | 112 | 2 | 30 | 118 | 1 | 30 |
| 12 | 113 / 112 | 2 / 2 | 29 / 1 | 118 | 1 | 30 |
| 13 | 122 | 1 | 30 | 124 / 125 | 2 / 2 | 28 / 2 |

46

METHOD AND APPARATUS FOR RECOVERING NORMALITY IN MOVING SEQUENCE OF MACHINERY

BACKGROUND OF THE INVENTION

1. Field of the Invention:

The present invention relates to moving sequence controlling apparatus for a plurality of machine tools, including industrial robots, and more particularly to a method and apparatus for recovering the normality of a moving sequence, which is suitable for automatically correcting a data table necessary for restarting and for judging what portion of a machine tool is displaying an abnormality in cases where an abnormality has occurred in a machine tool and a workstation has stopped.

2. Description of the Prior Art:

Recently, factory automation (FA) has come to be emphasized, and there has been a strong demand in the FA field for effecting efficient machining and assembling work by combining automatic machine tools, industrial robots, and the like.

When effecting cooperated operation by combining teaching playback-type robots and automatic machine tools, it has heretofore been necessary to compile a control program using interlocks between the various devices, and there has been a problem in that this work is extremely troublesome.

A method is known in which a parts-installing station using two robots is caused to operate cooperatively while effecting synchronous and exclusive control by means of interlocking signals, which was disclosed in "Application of a Mark flow Diagram to the Design of a Multi-Process Sequence Control System" in Report No. 1115 of the Lectures presented at the 19th Lecture Meeting of the Automatic Control Association (hereinafter referred to as Literature (1)) as well as in the "Proposal of a Station Controller (SCR) for Controlling a Workstation" in Report No. 1314 of the 22nd SICE Academic Lecture Meeting (hereinafter referred to as Literature (2)).

When an abnormality has occurred in a workstation controlled by the aforedescribed method and the workstation has stopped as a result, the operator must judge the condition of the trouble. Furthermore, in order to resume operation starting with the unit operation which had been in effect before the occurrence of the abnormality, there is a need to reset the internal condition of an operation management table (details of which will be described later) to the condition which had been in effect at that time. In this case, since each unit operation had been engaging or was engaged with an interlocking signal, it is difficult to judge regarding which operation No. the execution management status or operation status should be corrected. Particularly in the case of a unit operation in which two or more sync/excl steps have the operation No. as its execute stand-by operation No., i.e., in the case where a unit operation involves at least two sequences for executing the unit operation (said unit operation being hereafter referred to as a "junction operation"), it is difficult to reset the internal condition of the operation management table. For this reason, when an abnormality has occurred, much time is required in restarting the workstation. Also, when the portion needing alteration is mistaken, there is a danger of this leading to a reckless operation or possible damage to the equipment.

Additionally, in automated facilities where a large number of limit or proximity switches are used, the limit switches or the like are used to confirm the operation. However, since these limit switches or the like are physically operated, the level of their reliability is low. Moreover, when this type of switch fails, they have poor reproducibility.

For these reasons, in conventional automated facilities, when an abnormality has occurred in the facilities, there are problems in that it is difficult to identify the causes of the abnormality, and that, even if it is understood that a failed limit switch is the cause, it is quite troublesome to find out which limit switch is faulty.

To cope with this situation, it is feasible to input fault-diagnosing data different from the controlling data. To do this, however, it is of course necessary to separately compile diagnosing data, and, moreover, it is necessary to change the diagnosing data as well when a change is made in the controlling data. Thus, there are numerous disadvantageous and troublesome aspects to such a procedure.

SUMMARY OF THE INVENTION

A first object of the present invention is to provide a method and apparatus for recovering normality which will eliminate the drawbacks of the aforementioned prior art, and which, when an abnormality has occurred in the operation of a machine tool and a restart is to be effected in the course of the work, will be capable of setting the internal condition of a controlling data table necessary for a restart in a state which permits an automatic restart simply by appointing a unit operation for restarting the work.

To attain this first object, the present invention is characterized in that by taking note of the fact that, at the time of restarting after an abnormality has occurred in a workstation, it suffices to follow the reverse sequence of normal state back from a sync/excl step in which a unit operation No. where the abnormality has occurred is given an execute stand-by operation No., the unit operation where the abnormality has occurred is detected simply by appointing a unit operation for restarting the work, and the setting of the internal condition of a control data table necessary for restarting from the appointed unit operation is effected automatically. As a result, it is possible to readily restart the work from the appointed unit operation without returning to the initial starting point of the workstation.

Furthermore, when it is not possible to follow the reverse sequence of normal state back to the appointed unit operation, it is judged that a restart is impossible from the appointed unit operation, and an error message is displayed on a monitor terminal.

A second object of the present invention is to provide a method and apparatus for recovering normality permitting the resetting of the internal condition of the aforementioned operation management table even when a junction operation in which there exist two or more sequences for executing a unit operation is included.

To attain this second object, the present invention is characterized by the following: In a controller for executing a series of moving sequences including synchronous or exclusive moving sequences by a combination of each taught or programed unit operation of a plurality of machine tools, there are provided: a first storing means for storing the relationship of the executing sequence of each unit operation to be controlled synchronously or exclusively; a second storing means for storing the operational condition of each unit operation; a third storing means for storing operating instructions for executing each unit operation; and a fourth storing means for storing during the normal state the relationship of the executing sequence relating to that execution when a junction operation in which there exist two or more sequences leading to a unit operation is executed. When an abnormality has occurred while a unit operation is being executed, the reverse sequence of normal state is followed by referring to the relationship of the executing sequence of each unit operation by appointing a desired unit operation for restarting, and when there exist two or more reverse sequences in the course of the operation, the content of the second storing means is automatically corrected to a state permitting restarting from the unit operation in which the content of the second storing means has been appointed, by referring to the fourth storing means.

A third object of the present invention is to provide a method and apparatus for recovering normality which makes it possible to effect recovery of the normality of a system by simply and positively detecting the failure of limit switches or the like.

To attain this third object, the present invention is characterized in that, in automatic machine tools and the like in which a multiplicity of such contacts as limit switches are used, at the time of detecting the failure of limit switches or the like, it is possible to learn which unit operation is being executed (or completed) when each limit switch or the like changes to the ON or OFF state, and the data so learnt is stored. On the basis of this data, the failure of such contacts as the limit switches and the like is detected. However, since effecting this operation separately for each contact every time would involve processing an increased amount of data, sync-/excl steps in which the transition condition alone is not met while the moving sequence is being executed are automatically detected, and with respect to the limit switches relating to those sync/excl steps, judgment is made from the data learned during the normal state as to whether the limit switches should be in the ON or OFF status under the existing situation.

BRIEF DESCRIPTION OF THE DRAWINGS

The above and further objects, features and advantages of the present invention will become more apparent from the following detailed description taken in conjunction with the accompanying drawings, wherein:

FIG. 3 is a chart illustrating a sync/excl definition table;

FIG. 4 is a chart illustrating an operation management table;

FIG. 12 is a chart illustrating an operation management table related to the second embodiment of the present invention;

FIG. 13 is a chart showing a record table;

FIG. 14 is a chart showing a reverse execution candidate step storing stack;

FIGS. 20 to 25, inclusive, are charts illustrating control information tables;

DETAILED DESCRIPTION OF THE PREFERRED EMBODIMENTS

First, to facilitate an understanding of the present invention, procedures for cooperatively operating and controlling a parts installing station using two robots while effecting synchronous and exclusive control by means of interlocking signals will be described with reference to FIGS. 1 to 4.

Figure 1:
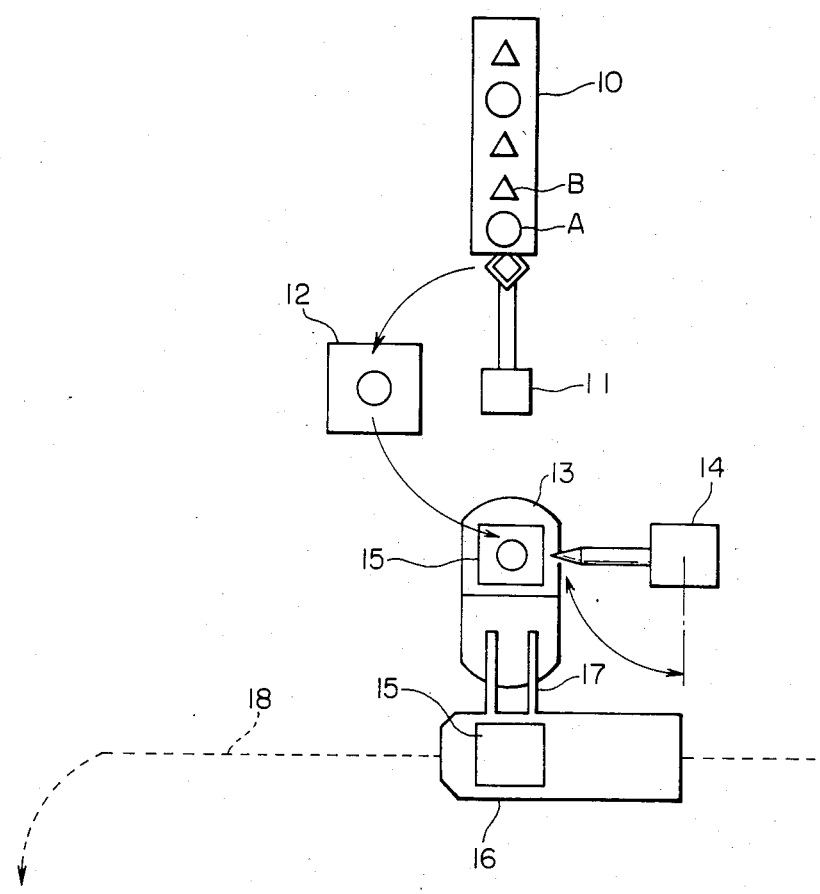
FIG. 1 is a schematic drawing of a parts installing station.

In FIG. 1, the reference numeral 17 denotes a guide rail for setting and removing a pallet. The reference numeral 18 denotes a travelling guide line for an unmanned truck. In addition, a circle A and a triangle B on a parts feeder 10 indicate the types of parts. The guide rail 17 for setting and removal can be extended from the unmanned truck 16, as required.

An outline of the operation of the aforementioned parts installing station is as follows: A parts handling robot 11 handles parts placed on the parts feeder 10, mounts them on a parts discriminator 12, and after the discriminator 12 distinguishes the type of part, conveys it to a parts installing pallet 15 on a rotary table 13. A screwing robot 14 performs the screwing of parts placed on the pallet 15. On completion of screwing, the parts are delivered together with the pallet 15 from the rotary table 13 by means of the unmanned truck 16.

Figure 2:
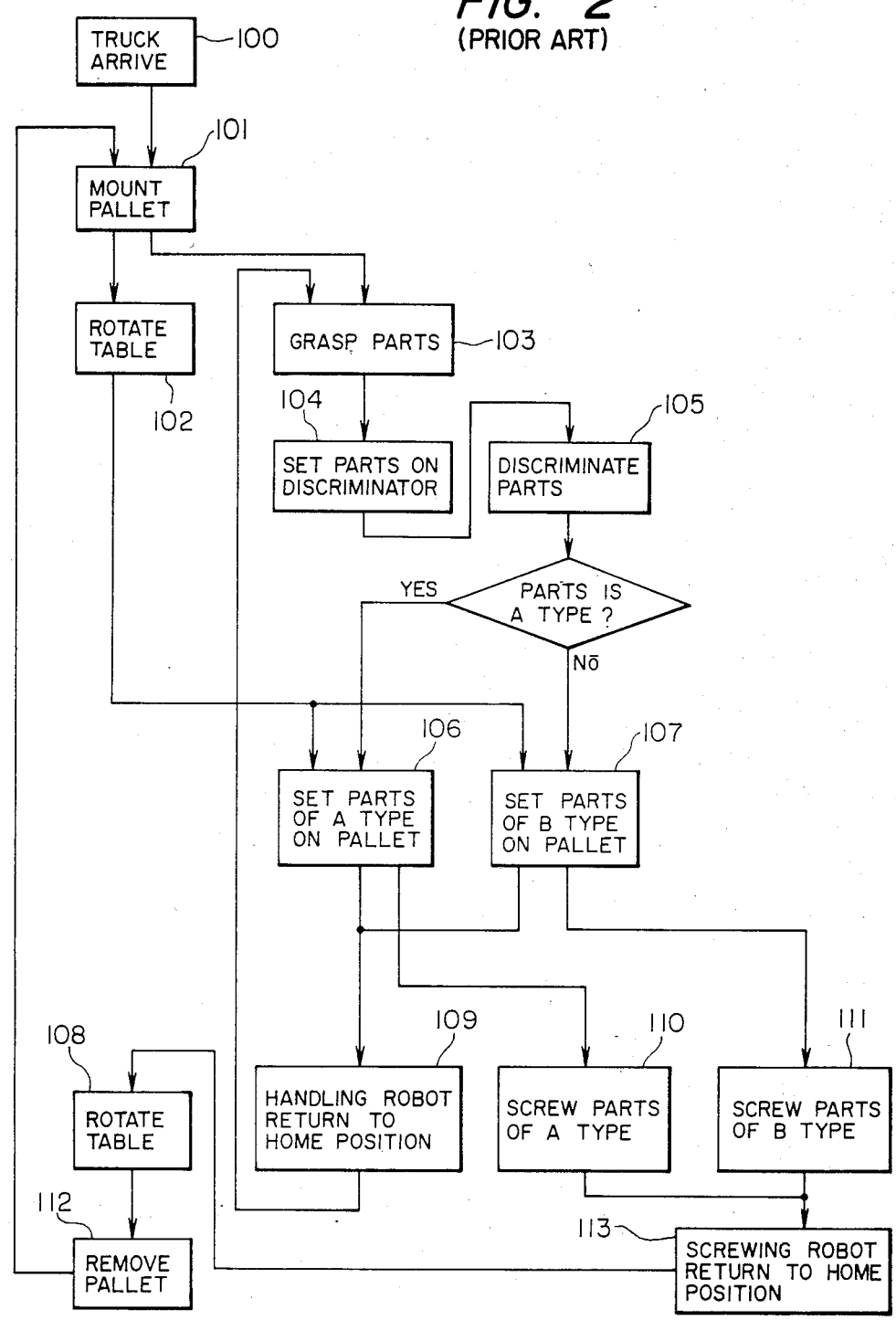
FIG. 2 is a drawing illustrating the synchronous and exclusive relationships among each machine tool shown in FIG. 1.

FIG. 2 shows the operational sequence of each machine tool described in FIG. 1.

In FIG. 2, blocks 100 to 113 show the unit operation (the unit of teaching data and control program) of each machine tool, and arrows connecting blocks indicate interlocking relationships for effecting synchonous and exclusive control among each unit operation (blocks 100 to 113). In other words, an arrow means that, at the point of time when a unit operation shown by a block where an arrow starts is completed and when a transition condition, e.g., the ON/OFF condition of a limit switch, is met, a unit operation shown by a block where the arrow terminates is executed. In the sequence shown in FIG. 2, as a transition condition for completing a unit operation 103 "GRASP PARTS" and for executing a unit operation 104 "SET PARTS ON DISCRIMINATOR," it is possible to determine where the limit switch provided on the hand portion of the robot 11 has been turned ON.

This is to confirm whether or not parts have been grasped positively, and the transition condition is not met if the limit switch is OFF. For instance, it is judged that the unit operation 103 "GRASP PARTS" failed because of some cause, such as the falling of the parts, and the robot consequently stops. In the case where one block serves as a terminal point for a number of arrows, the operation indicated in the block where the arrows terminate is executed at the time when all the unit operations shown in the blocks that serve as starting points for the respective arrows have been completed.

The execution judgment for controlling the progress of a moving sequence shown in FIG. 2 is effected by making use of a sync/excl step definition table shown in FIG. 3 and an operation management table shown in FIG. 4.

In FIG. 3, a completion stand-by operation No. means the No. of a block indicating the unit operation which is currently in effect and is being interlocked for synchronous and exclusive control. On the other hand, an execute stand-by operation No. is the No. of a block indicating the unit operation which is currently stopped and is waiting for an interlocking signal for synchronous and exclusive control.

In an operation management table given in FIG. 4, as an execute management status 'a,' there are execute standby and execute completion statuses, the execute stand-by status being indicated by '0,' and the execute completion status by '1.' From this, it is possible to know how far the moving sequence stored in the sync-/excl step definition table has proceeded. As for an operation status 'b' given in the next column, there are operation completion and in-operation statuses, the operation completion status being indicated by '1,' and the in-operation status by '2.' From this, it is possible to know whether or not an operation unit corresponding to the executed operation No. has been completed or is still being executed. A message No. given in the next column is a pointer that provides a starting point for retrieving control information to be transmitted to each machine tool.

In the execution judgment for advancing the moving sequence, the completion stand-by operation Nos. and execute stand-by operation Nos. of all the sync/excl steps registered in the sync/excl step definition table shown in FIG. 3 are read out. Then, a sync/excl step No. in which all the completion stand-by Nos. have been executed and operations have been completed, and in which all the execute stand-by operation Nos. are on execute stand-by, is found. Then, the unit operation of the execute stand-by operation No. corresponding to this sync/excl step No. is executed, while an execute management status a corresponding to the operation No. in the operation management table is set to '1,' and the operation status b to '2.'

Conventionally, moving sequences have been controlled by the aforementioned method. When an abnormality has occurred and a workstation has stopped as a result, however, in order to resume work starting with a unit operation which will permit the restarting of the work and which had been in effect before the occurrence of the abnormality, it is necessary to reset the internal condition of the operation management table shown in FIG. 4 to the condition which had been in effect at that time. In this case, since each unit operation had been engaging or was engaged with interlocking signals, it is difficult to judge to which operation No. the execution management status or operation status should be corrected.

Also, limit switches or the like that are used to confirm the operation in automated facilities have a low level of reliability. Moreover, these types of switch, when failed, have poor reproducibility. For these reasons, when an abnormality has occurred in conventional automated machine tools, there are problems in that it is difficult to understand why the abnormality occurred, and in that, even if it is understood that a failed limit switch was the cause, it is quite troublesome to find which limit switch is faulty.

Figure 5:
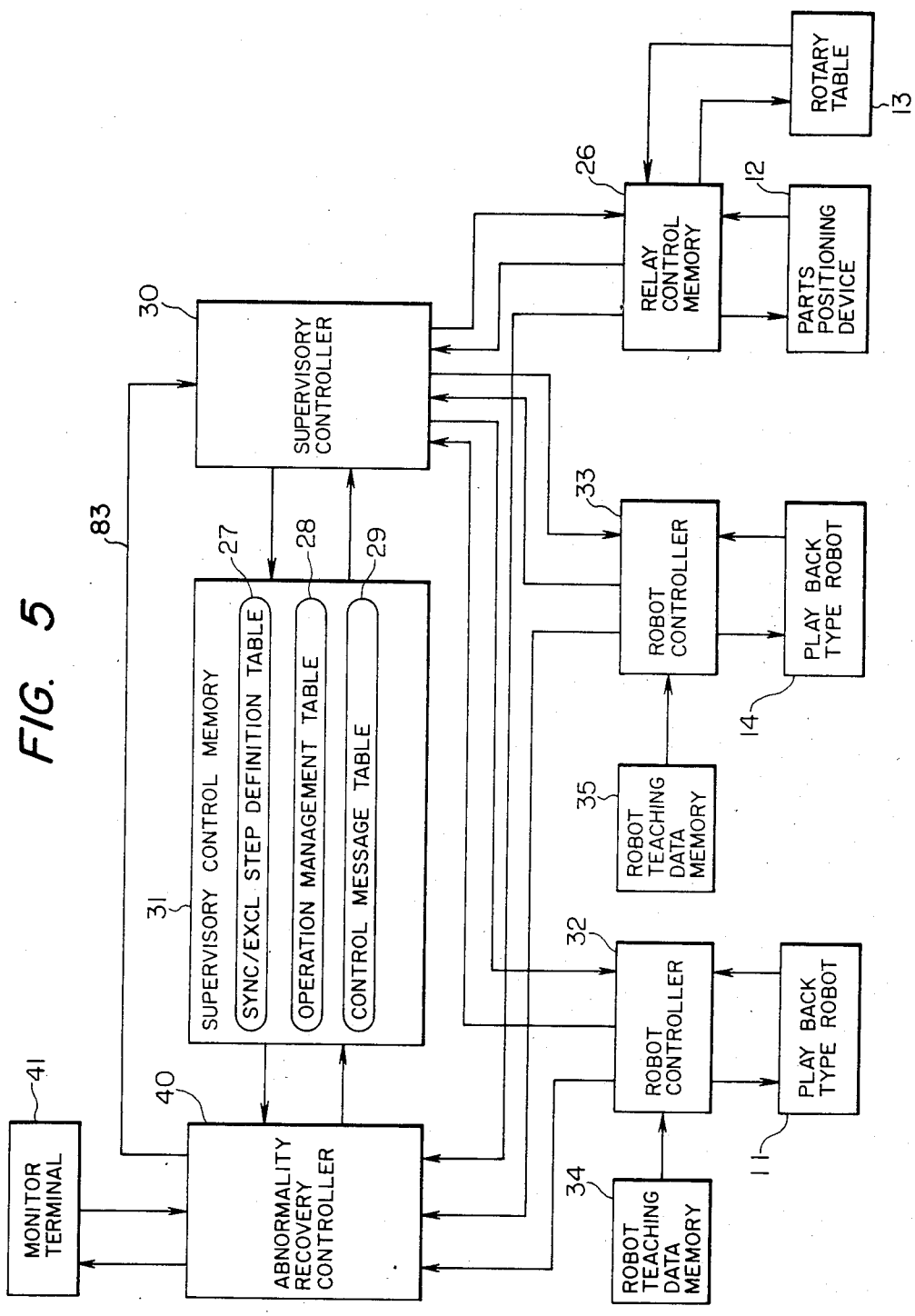
FIG. 5 is an overall block diagram of a first embodiment of the present invention.
Figures 7, 8:
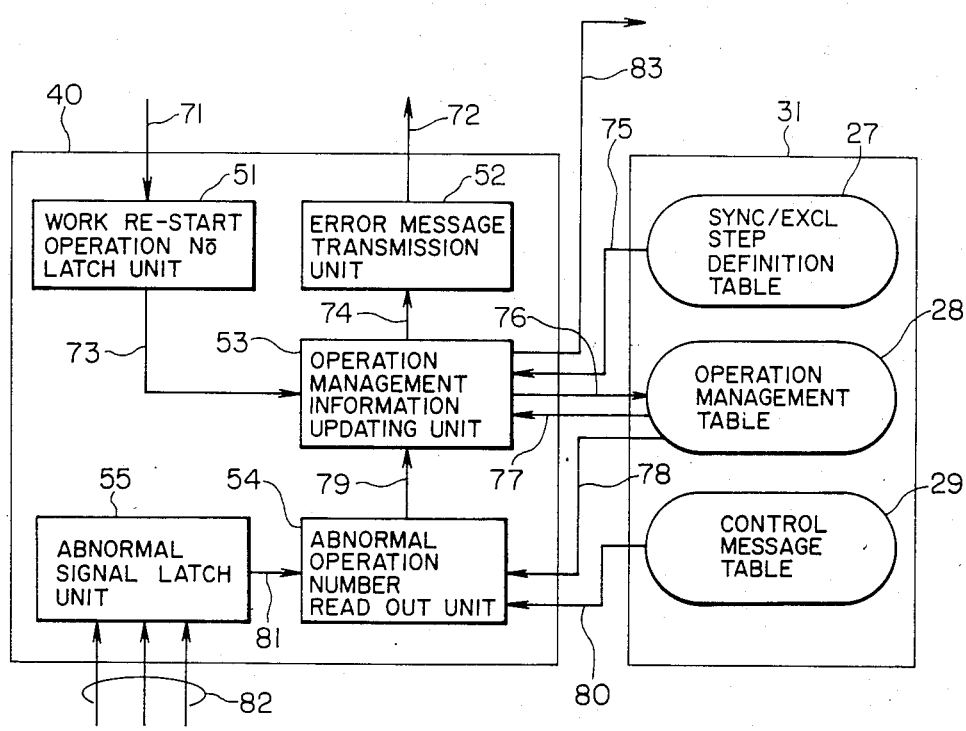
FIG. 7 is a chart illustrating a control message table.
FIG. 8 is a block diagram of a normality recovery controller.
Figure 9:
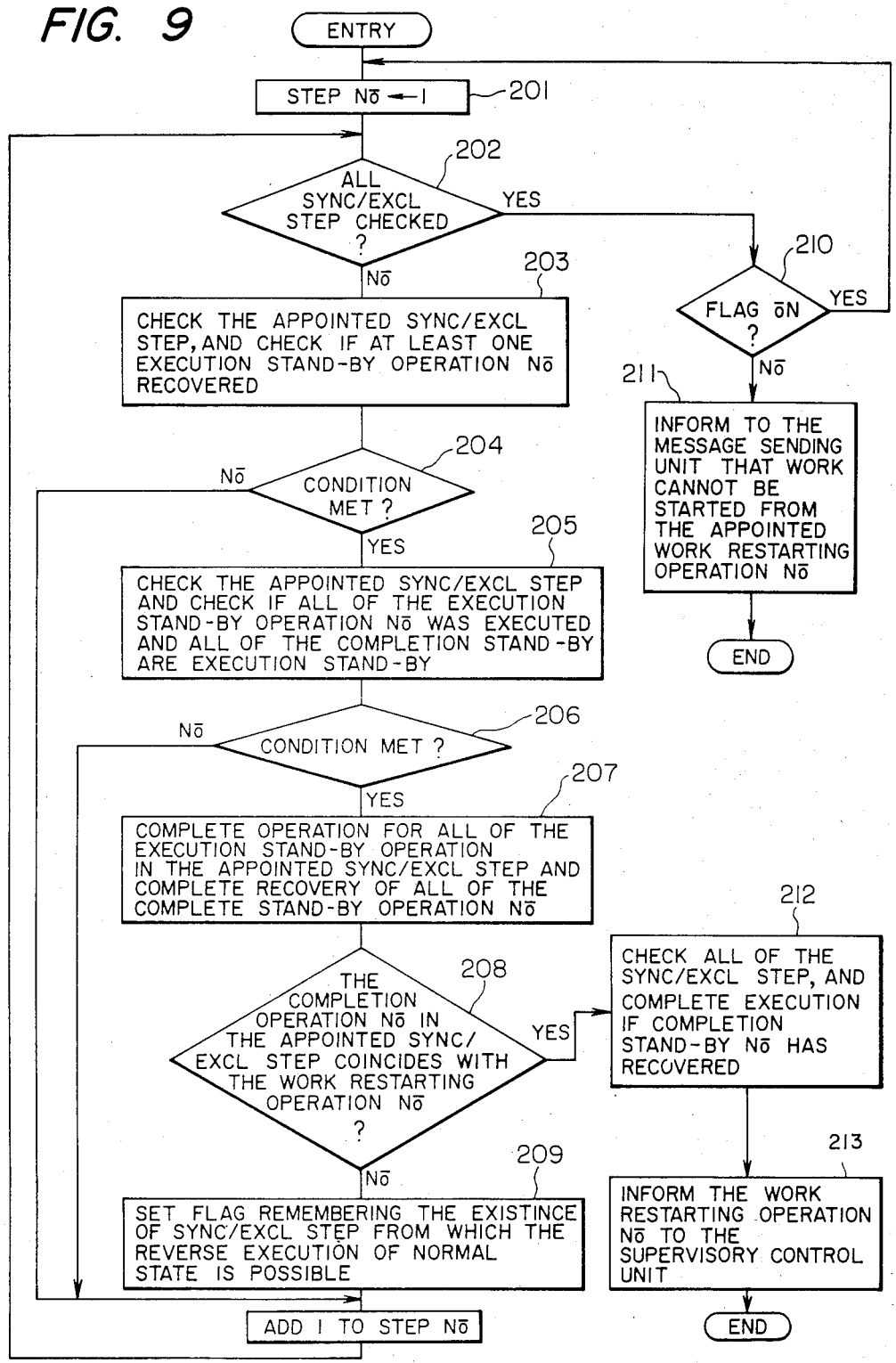
FIG. 9 is a flow chart of a process for updating operation management information.

Description will be made hereafter of specific embodiments of the present invention. FIG. 5 is a block diagram of an embodiment relating to the first object of the present invention, wherein the reference numerals 32, 33 denote robot controllers; 34 and 35, robot teaching data memories; 11 and 14, play-back robots; 26, a relay control memory; 12, a parts positioning device; and 13, a rotary table. The reference numerals 27 and 28 denote tables for storing supervisory control information, 27 being a sync/excl step definition table and 28 an operation management table; and 29, a control message table. The control message table 29 is shown in FIG. 7. Additionally, the reference numeral 40 denotes an abnormality recovery controller, and 41, a monitor terminal.

In FIG. 5, a supervisory controller 30 effects sync/excl control for the operation of a plurality of machine tools using the tables 27, 28 and 29 stored in the supervisory control memory 31. The configuration of the supervisory controller 30 is shown in FIG. 6 together with the configuration of the supervisory control memory 31, and their operations are described below.

Figure 6:
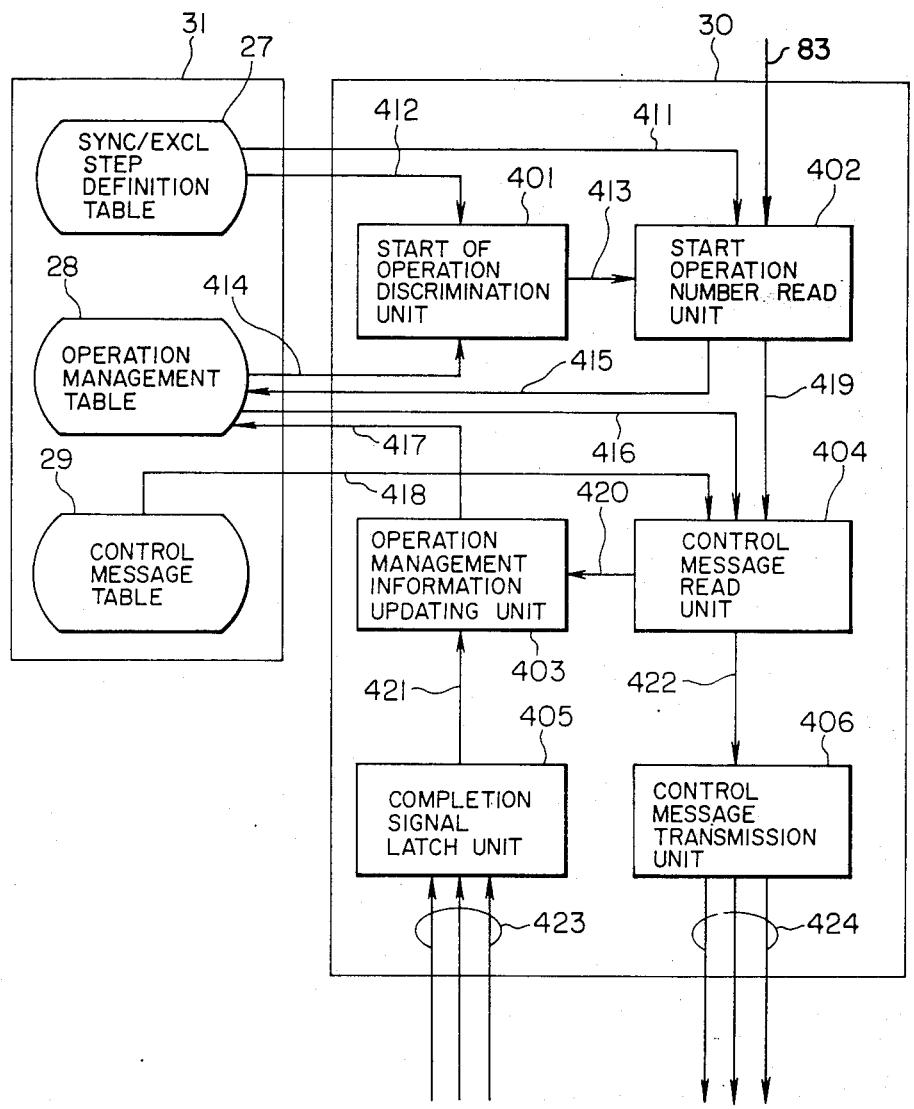
FIG. 6 is a block diagram of a supervisory controller.

In FIG. 6, a start of operation discrimination unit 401 reads out completion stand-by and execute stand-by operation Nos. as well as their execute management statuses a in FIG. 4 and operation statuses b in FIG. 4 (arrows 412 and 414) from the sync/excl step definition table 27 and the operation management table 28. The start of operation discrimination unit 401 then selects a sync/excl step No. which will permit starting, in which all the completion stand-by operation Nos. have been executed and operations have been completed, and in which all the execute stand-by operation Nos. are on execute stand-by. Then, the start of operation discrimination unit 401 transmits the selected sync/excl step No. to a start operation number read unit 402 (arrow 413).

The start operation number read unit 402 first reads out a corresponding execute stand-by operation No. from the sync/excl step definition table 27, and transmits it to a control message read unit 404 (arrow 419). Then, the start operation number read unit 402 sets in the execution completed status the execute management status a in FIG. 4 of a corresponding operation No. in the operation management table having a structure shown in FIG. 4 and sets its operation status b in FIG. 4 in the in-operation status (arrow 415).

The control message read unit 404 reads out a message to be transmitted from the operation management table 28 (arrow 416) on the basis of the operation No. sent from the start operation number read unit 402 (arrow 419). The control message read unit 404 then reads out from the control message table control information as well as a destination address corresponding to this message No. (arrow 418), and transmits them to a control message tranmission unit 406 (arrow 422). Then, the control message read unit 404 informs an operation management information updating unit 403 of the destination of the message and the execute operation No. (arrow 420).

The control message transmission unit 406 reads the destination address and transmits control information to the controller of a corresponding machine tool (arrow 424).

In compliance with the control information sent from the supervisory controller 30, each machine tool effects a unit operation which has been taught or programmed in advance, and transmits a completion signal to a completion signal latch unit 405 upon completion of the execution of the unit operation (arrow 423).

The operation management information updating unit 403 refers to the content of a latched completion signal, and updates the operation status of the corresponding operation No. from the in-operation status to the operation-completed status on the basis of the information received from the control message read unit 404 (arrow 417).

In the normal state, by repeating the aforementioned operations, the supervisory controller 30 automatically effects synchronous and exclusive control for starting the unit operations of a number of machine tools in accordance with the moving sequence stored in the table in the supervisory control memory 31.

The configuration of the abnormality recovery controller 40 is shown in FIG. 8, and its operation will be described hereinafter.

In FIG. 8, an operation management information updating unit 53 reads out the operation No. for restarting the appointed work as well as the abnormality stopped operation No. from the work restart operation No. latch unit 51 and an abnormal operation number read out unit 54 (arrows 73 and 79). The operation management information updating unit 53 first sets the execute management status a in FIG. 4 and operation status b in FIG. 4 of the abnormality stopped operation No. in the recovered status and the operation completed status. Then, the operation management information updating unit 53 selects a sync/excl step No. in which recovered operation Nos. are included among the execute stand-by operation Nos. thereof and the remaining execute stand-by Nos. have been executed, and in which completion stand-by operation Nos. are all on execute stand-by (steps 203 and 205), sets all the execute stand-by operation Nos. of the sync/excl step in the operation completed status, and sets all the completion stand-by operation Nos. in the recovered status (step 207). Then, a check is made as to whether or not the completion stand-by operation No. of the sync/excl step coincides with the work restarting operation No. (step 208). If they do not coincide, the aforementioned processes are repeated until they coincide. A detailed example of the operation of the operation management information updating unit 53 will be described later.

Figure 10:
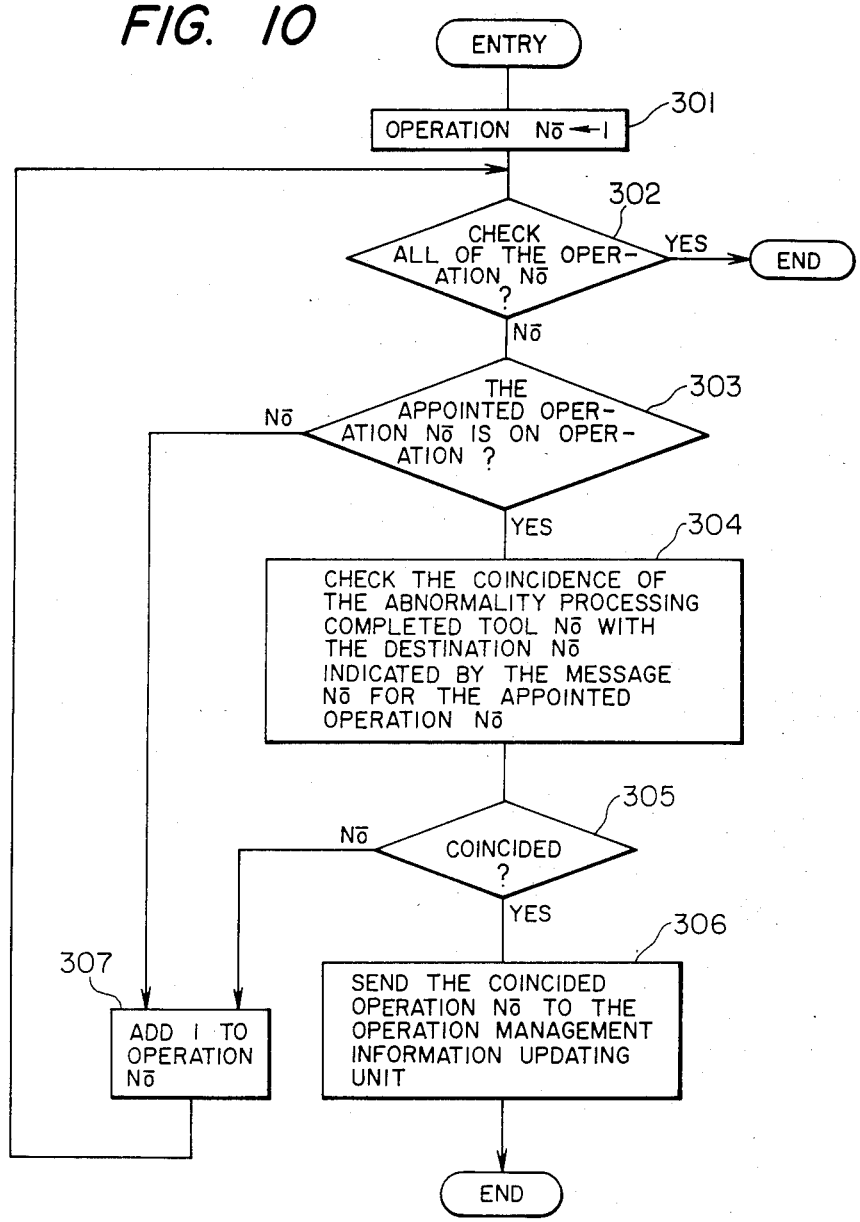
FIG. 10 is a flow chart of a process for reading out an abnormal operation No.

The abnormal operation number read out unit 54 reads out the operation management table 28 and the control message table 29 (arrows 78 and 80), and finds out the number of the operation where an abnormality has occurred, by means of the number of the machine tool where the abnormality occurred, which is transmitted from the abnormal signal latch unit 55 (arrow 81), in accordance with the flow chart shown in FIG. 10. The abnormal operation number read out unit 54 then transmits the found operation No. to the operation management information updating unit 53 (arrow 79).

The abnormal signal latch unit 55 receives an abnormal signal from the machine tool where the abnormality occurred (arrow 82), and transmits the number of the machine tool where the abnormality occurred to the abnormal operation number read out unit 54 (arrow 81). The work restart operation No. latch unit 51 receives an operation No. for restarting work appointed from outside (arrow 71), and transmits the operation No. to the operation management information updating unit 53 (arrow 73). The error message transmission unit 52 transmits an error message to the monitor terminal shown in FIG. 5 in a case where it is judged in the operation management information updating unit 53 that work cannot be restarted from the appointed work restarting operation No. (details will be described later).

Next, the specifics of the operation of the operation management information updating unit 53 will be described. As for the subject moving sequence, the one shown in FIG. 2 is used. Here, we will consider a case in which an abnormality has occurred in the operation No. 108 and work is to be restarted from the operation No. 105. First, the operation No. 108 is set in recovered and operation-completed state. Then, all sync/excl steps are checked, and the sync/excl step No. 4 in which at least one recovered operation No. is included among the execute stand-by operation Nos. and the remaining execute stand-by operation Nos. have been executed, and in which all the completion stand-by operation Nos. are on execute stand-by, is selected. All the execute stand-by operation Nos. of the sync/excl step No. 4 are set on operation stand-by, and all the completion stand-by operation Nos. are set in the recovered state. Since the completion stand-by operation Nos. of the sync/excl step No. do not coincide with the work restart operation No., the aforementioned processes are repeated until a coinciding sync/excl step is found. If the completion stand-by operation Nos. of the sync/excl step and the work restart operation Nos. coincide, all the sync/excl steps are checked, and if the completion stand-by operation No. is recovered, it is set in execution-completed state. Then, the work restart operation No. is transmitted to the supervisory controller 30 (arrow 83). In the case of the example shown in FIG. 2, only one part is set on the pallet. In the case of setting a plurality of parts on the pallet and effecting screwing for each part, however, when a problem has occurred in the operation 105, the parts handling robot has already completed the operation 105 "GRAB NEXT PARTS." In this case, since it is impossible to restart work from the work restart operation No. appointed in advance, it is possible to return to a state permitting the restarting of work from the appointed work restarting operation No. by further returning the moving sequence stopped at the operation No. 105 to an operation No. which permits the restarting of the appointed work by an operation similar to the one described above. When it is impossible to return to a state allowing the restarting of work from a work restarting operation No. thus appointed by a single operation, all the sync/excl steps are checked, an indication is given as to the sync/excl step at which a condition was not met by displaying on the monitor terminal 41 a sync/excl step whose execution stand-by operation No. has been recovered, and guidance is effected to issue an instruction for restarting new work.

The supervisory controller 30, which has received the work restarting operation No. from the operation management information updating unit 53 in the abnormality recovery controller 40, reads out a control message concerning the received work restarting operation No. from the control message table 29, transmits the control information to the destination No., and returns to the normal state moving sequence described earlier.

According to this embodiment, when an abnormality has occurred in a workstation and each tool has stopped, the internal condition of the operation management table 28 can, simply by appointing an operation number for restarting the work, be automatically reset to a state permitting the restarting of work with respect only to the unit operational sequence relating to the number of the operation where the abnormality occurred.

In this embodiment, if the status of operation stand-by is added to the operation status b in FIG. 4, it is possible to set the work restarting operation No. on operation stand-by in the operation management information updating unit 53 without sending the work restarting operation No. from the operation management information updating unit 53 to the supervisory controller 30, and the normal state moving sequence described earlier can be effected after executing the operation which had been on operation stand-by in the supervisory controller 30.

In addition, although in this embodiment the abnormality recovery controller 40 and the supervisory controller 30 are provided independently, it is possible to integrate them into one device.

Figure 11:
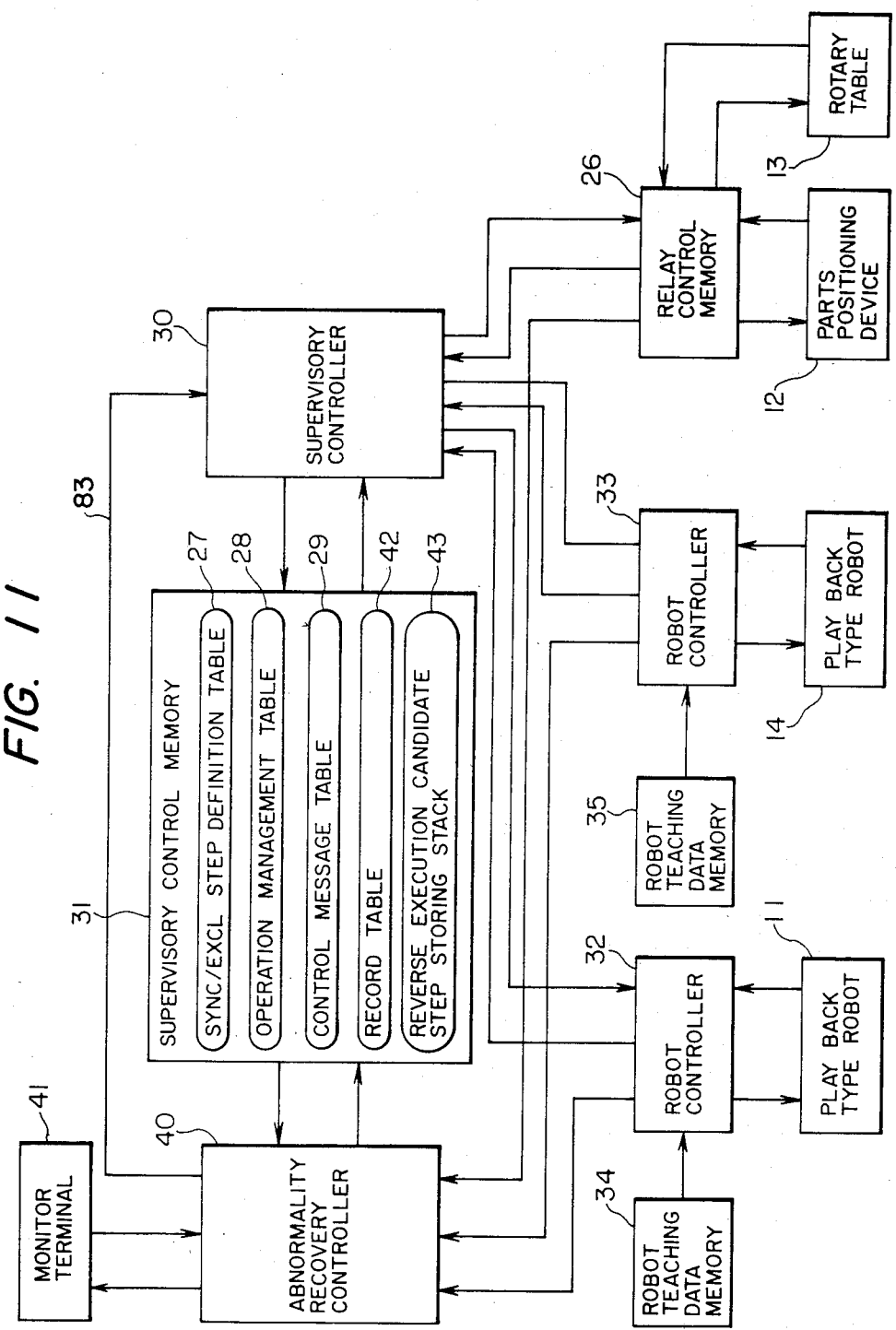
FIG. 11 is an overall block diagam of a second embodiment of the present invention.

Next, a second embodiment of the present invention will be described. FIG. 11 is a block diagram illustrating an embodiment relating to the second object of the present invention. The record table 42 and the reverse execution candidate step storing stack 43 (hereinafter referred to as the "stack") are added to the supervisory control memory 31 shown in FIG. 5.

The contents of the sync/excl step definition table 27 and the control message table 29 in the supervisory control memory 31 are the same as the ones shown in FIGS. 3 and 7, respectively.

FIG. 12 is a diagram of the operation management table 28 in the supervisory control memory 31. In FIG. 12, the recovery completion status '2' is added to the execute management status 'a,' in addition to the execution stand-by status '0' and the execution completion status '1.' The operation status 'b' and the message No. are the same as the ones shown in FIG. 4. The junction operation 'c' indicates whether or not the unit operation is a junction operation.

The record table 42 is a ring buffer such as the one shown in FIG. 13 and is a table for storing in sequence the sync/excl steps and junction operation Nos. with respect to sync/excl steps in which the aforementioned junction operations are included in the execution stand-by operation Nos. of the sync/excl steps executed during the execution of the sequence. In addition, the reverse execution candidate step storing stack 43 stores sync/excl steps which are candidates for reverse execution at the time of recovering the normality.

Figure 15:
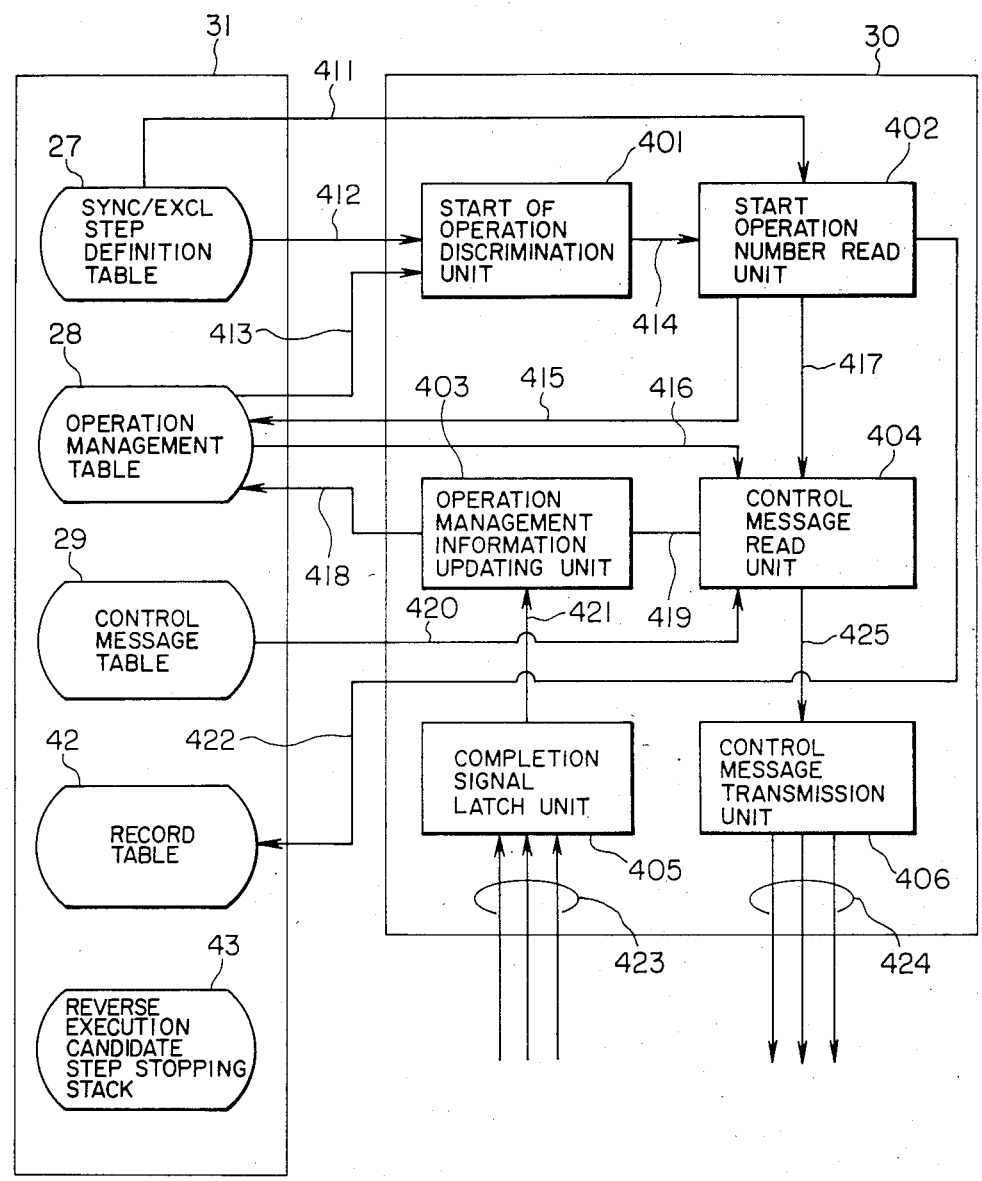
FIG. 15 is a block diagram of a supervisory controller related to the second embodiment.

The supervisory controller 30 effects the synchronous and exclusive control of the operation of a plurality of machine tools using tables 27, 28, and 29 and the stack 43. The connection relationship between the configuration of the supervisory controller 30 and the memory 31 is shown in FIG. 15.

The operation of the supervisory controller 30 is described hereafter with respect to those of its portions that differ from those shown in FIG. 6.

In a case where the execute stand-by operation No. of the sync/excl step received from the start of operation discrimination unit 401 is a junction operation, the sync/excl step and the junction operation No. are stored in a place indicated by the write pointer of the record table 42 (arrow 422), and 1 is added to the write pointer. In this case, when the write pointer has exceeded the maximum number of write operations, the write pointer is set to 1.

At the time of restarting when an abnormality has occurred in a machine tool, it suffices to follow the sequence which is reverse to that of the normal state with respect to the unit operation where the abnormality occurred, from the sync/excl step for changing the unit operation No. where the abnormality occurred into an execution stand-by operation No. to a sync/excl step for changing the unit operation No. for restarting the work into a completion stand-by operation No. However, in a case where there is a junction operation midway in the reverse sequence, and where there exist two or more reverse sequences, it is necessary to decide on one of the reverse sequences. Therefore, according to this embodiment, the abnormality recovery controller 40 is arranged as shown in FIG. 16, a reverse sequence candidate step is stored in the stack 43 in the following procedure, and one reverse sequence is selected using this abnormality recovery controller 40.

Figure 16:
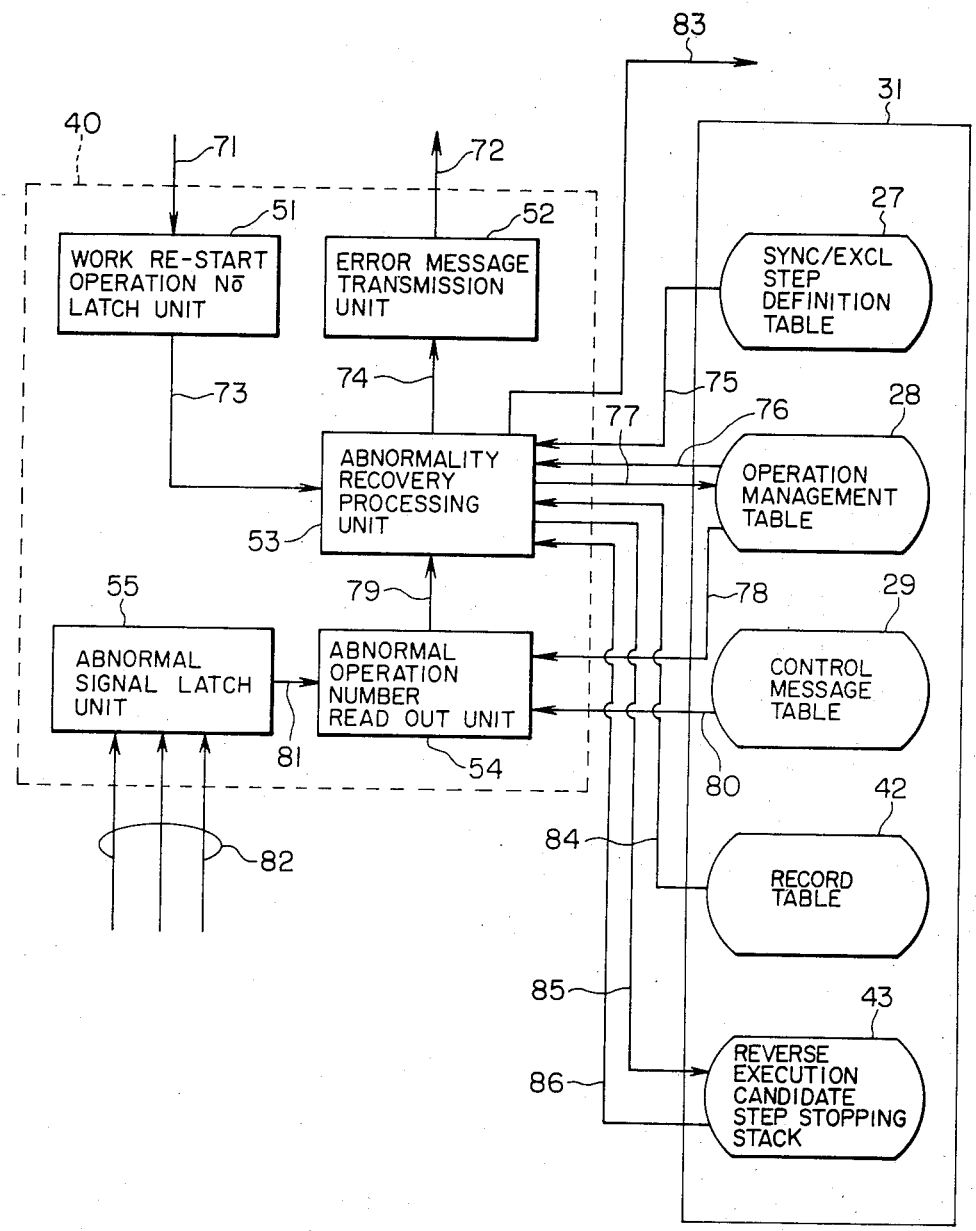
FIG. 16 is a block diagram of a normality recovery controller.

In FIG. 16, the reference numeral 51 denotes the work restart operation No. latch unit; 52, the message sending unit; 53, the abnormality recovery processing unit; 54, the abnormal operation number read out unit; and 55, the abnormal signal latch unit.

The abnormal signal latch unit 55 receives an abnormal signal from a machine tool where an abnormality has occured (arrow 82), and sends to the abnormal operation number read out unit 54 the number of the tool where the abnormality occurred (arrow 81).

Figure 17:
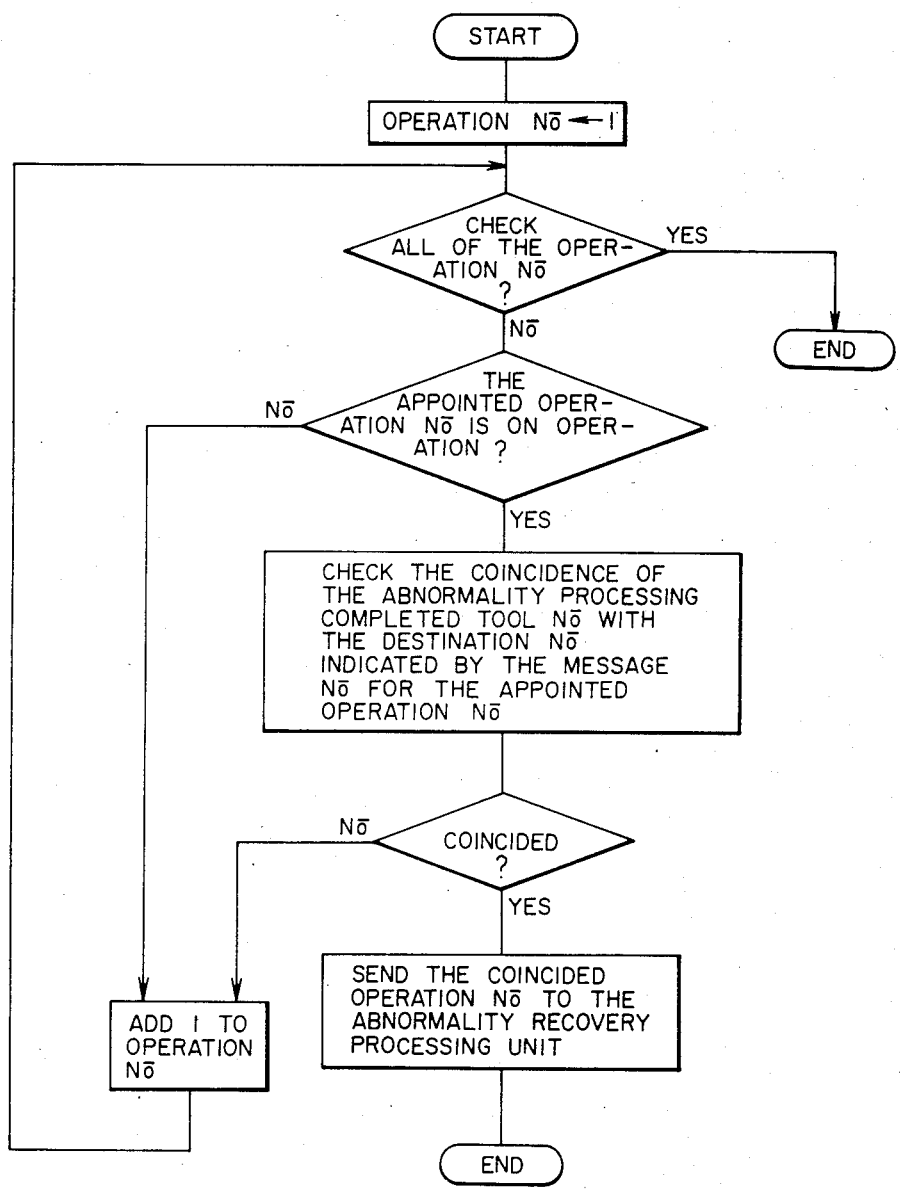
FIG. 17 is a flow chart for processing by the abnormal operation number read out unit.

The abnormal operation number read out unit 54 reads out the operation management table 28 and the control message table 29 (arrows 78 and 80), extracts the number of the operation where the abnormality occurred from the tool No. sent from the abnormal signal latch unit 55 in accordance with the flow chart shown in FIG. 17, and sends the same to the abnormality recovery processing unit 53 (arrow 79).

The work restarting operation No. latch unit 51 receives an operation No. appointed by the external monitor terminal 41 and used for restarting the work (arrow 71), and sends the same to the abnormality recovery processing unit 53 (arrow 73).

The abnormality recovery processing unit 53 reads out operation Nos. for restarting the respectively appointed work and the number of the operation where the abnormality stop occurred from the work restart operation No. latch unit 51 and the abnormal operation number read out unit 54 (arrows 73 and 79). The abnormality recovery processing unit 53 first sets the operation management status a and operation status b of the number of the operation where the abnormality stop occurred in recovered and operation-completed state in the operation management table 28 (arrow 77).

Figure 18A:
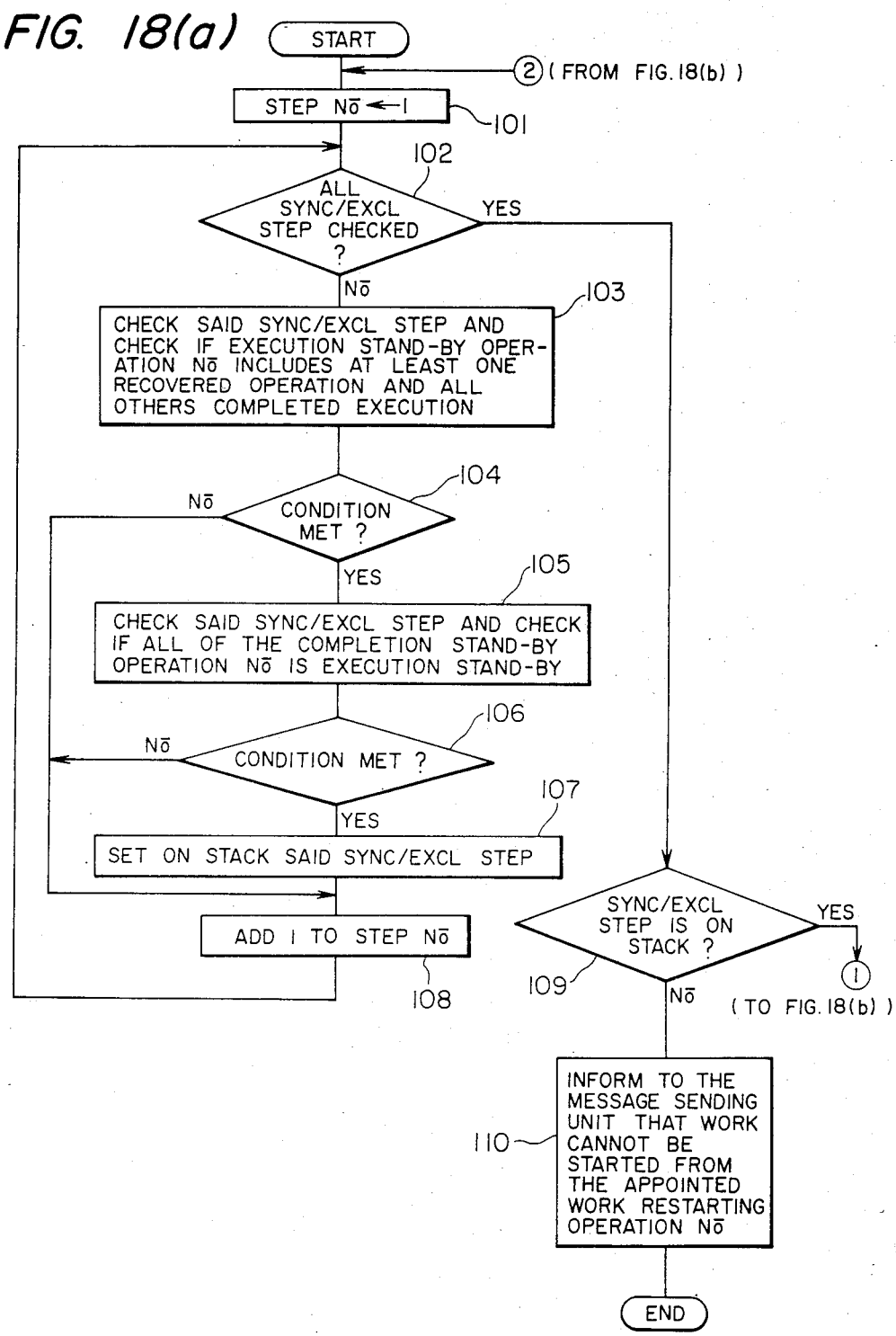
FIGS. 18(a) and 18(b) are flow charts for processing by a normality recovery processing unit.
Figure 18B:
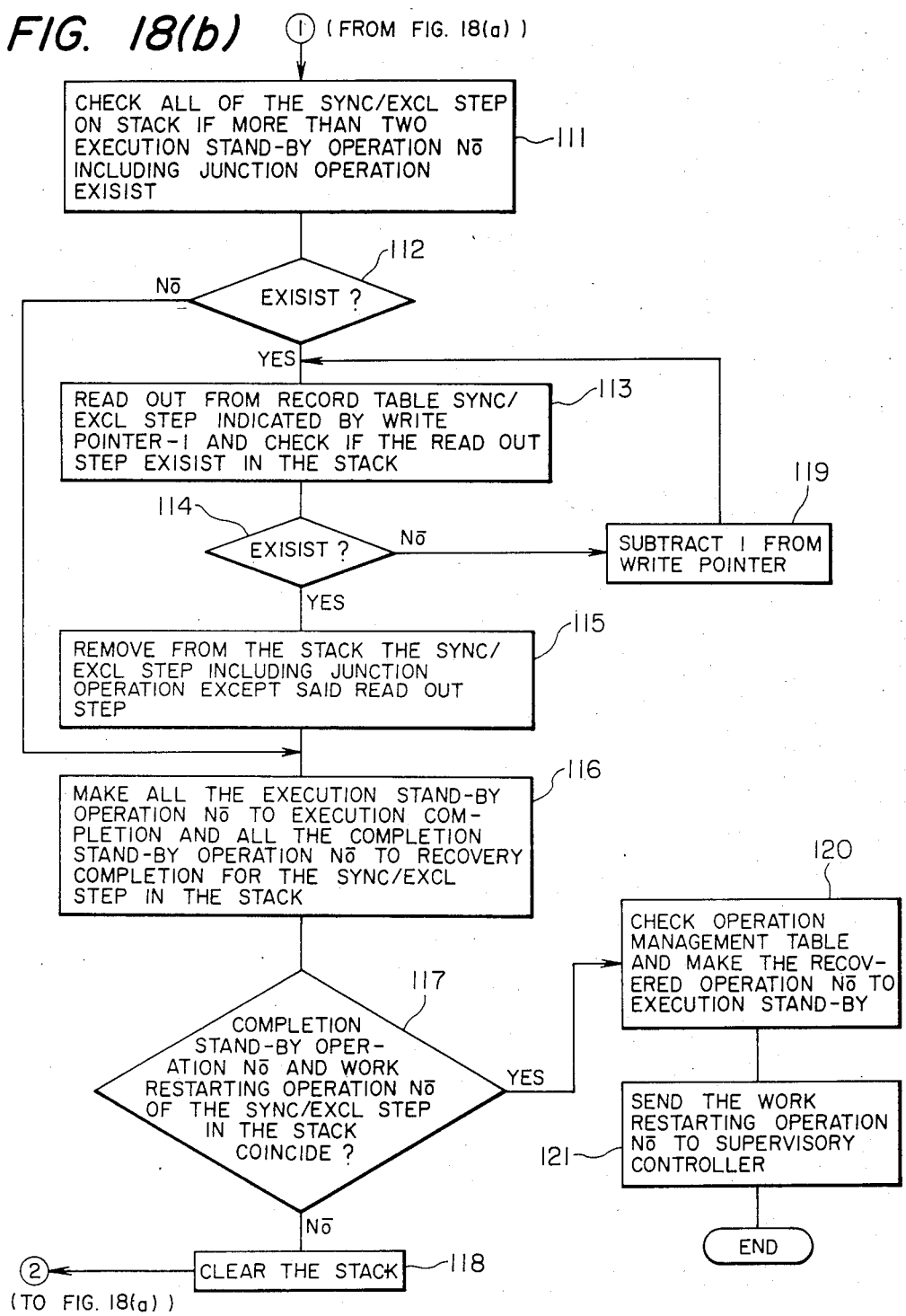

Then, the abnormality recovery processing unit 53 finds out the sync/excl steps in which recovered operation Nos. are included among the execute stand-by operation Nos. and the remaining execute stand-by operation Nos. which have been executed, and in which all the completion stand-by operation Nos. are on execution stand-by, and said sync/excl steps are stored in the stack 43 (arrow 85, blocks 101 to 108 in FIG. 18).

Furthermore, if there are sync/excl steps that include the same junction operations as execute stand-by operation Nos. among the sync/excl steps stored in the stack 43, sync/excl steps stored in the record table 42 are read out in the newly stored order (arrow 84), and it is checked whether or not there are any sync/excl steps that coincide with the sync/excl steps stored in the stack 43 (block 109 in FIG. 18).

If they coincide, sync/excl steps that include junction operations, with the exception of sync/excl steps read out from the record table 42, are erased. Then, all the execute stand-by operation Nos. of the sync/excl steps stored in the stack 43 are set on execute stand-by, and all the completion stand-by operation Nos. are set in recovered state (blocks 111 to 116 and 119 in FIG. 18). The fact of whether or not the completion stand-by operation Nos. of these sync/excl steps coincide with the appointed work restarting operation Nos. is checked. If they do not coincide, the aforementioned processes are repeated until they coincide (blocks 120 and 121 in FIG. 18).

If it is judged in the abnormality recovery processing unit 53 that it is impossible to restart the work from the appointed work restarting operation No. (details of which will be described later), the message sending unit 52 sends an error message to the monitor terminal 41 (arrow 72).

Next, a specific example of the operation of the abnormality recovery processing unit 53 will be described for a case in which an abnormality has occurred in the operation No. 113 in the moving sequence shown in FIG. 2 and work is restarted from the operation No. 106.

When an operator or the like judges the situation of the occurrence of the abnormality and inputs a restarting operation No., the abnormality recovery processing unit 53 first sets the operation No. 113 where the abnormality has occurred in recovered and operation-completed state. Then, all the sync/excl steps are checked, and sync/excl steps Nos. 6 and 7 in which at least one recovered operation No. is included among the execute stand-by operation Nos. and the remaining execute stand-by operation Nos. have been executed, and in which all the completion stand-by operation Nos. are on execute stand-by, are selected (refer to FIG. 3). Here, since the sync/excl steps Nos. 6 and 7 include a junction operation No. 113 in their execute stand-by operation Nos., the record table 42 is checked and the sync/excl step No. 6 is selected. Furthermore, all the execute stand-by operation Nos. of the sync/excl step No. 6 are set on execute stand-by, and all the completion stand-by operation Nos. are set in recovered state. Since the completion stand-by operation Nos. of the sync/excl step No. 6 and the work restarting operation Nos. do not coincide, the aforementioned processes are repeated until coinciding sync/excl steps are found. When found, all the sync/excl steps are checked, and if completion stand-by Nos. have been recovered, they are set on execute stand-by. Then, the work restarting operation No. is sent to the supervisory controller 30 (refer to the arrow 83 in FIG. 16).

In the case of the example shown in FIG. 2, only one part is set on the pallet. In the case of setting a plurality of parts on the pallet and effecting screwing for each part, when trouble has occurred at the operation No. 113 "SCREWING ROBOT RETURN TO HOME POSITION," the parts handling robot has already executed the operation of the operation No. 103 "GRASP NEXT PARTS." In this case, since it is impossible to restart the work from the appointed work restarting operation No., it is possible to return from the appointed work restarting operation No. to a state permitting the restarting of work, by returning further the moving sequence stopped at the operation No. 103 to an operation No. permitting the restarting of appointed work by means of an operation similar to the one described above. Thus, when it is impossible to return to a state permitting the restarting of work from the work restarting operation No. appointed by a single instruction, all the sync/excl steps are checked, an indication is given specifying at what sync/excl step a condition was met by displaying on the monitor terminal 41 a sync/excl step whose execution stand-by operation No. has recovered, and guidance is effected to issue an instruction for restarting new work.

In the supervisory controller 30 which has received the work restarting operation No. from the abnormality recovery processing unit 53, control information on the received work restarting operation No. is read out from the control message table 29, the control information is sent to its destination, and the operation returns to the moving sequence of normal state described earlier.

According to this embodiment, when an abnormality has occurred in a workstation and each machine tool has stopped, the internal condition of the operation management table 28 can, simply by appointing an operation number for restarting the work, be automatically reset to a state permitting the restarting of work with respect only to the unit operational sequence relating to the number of the operation where the abnormality occurred.

In this embodiment, if the status (mode) of operation stand-by is added to the operation status b in FIG. 4, it is possible to set the work restarting operation No. on operation stand-by in the abnormality recovery processing unit 53 without sending the work restarting operation No. from the abnormality recovery processing unit 53 to the supervisory controller 30, and the moving sequence of normal state described earlier can be effected after executing the operation which had been on operation stand-by in the supervisory controller 30.

In addition, although in this embodiment the abnormality recovery controller 40 and the supervisory controller 30 are provided independently, it is possible to integrate them into one device.

Next, a third embodiment of the present invention will be described hereafter.

Figure 19:
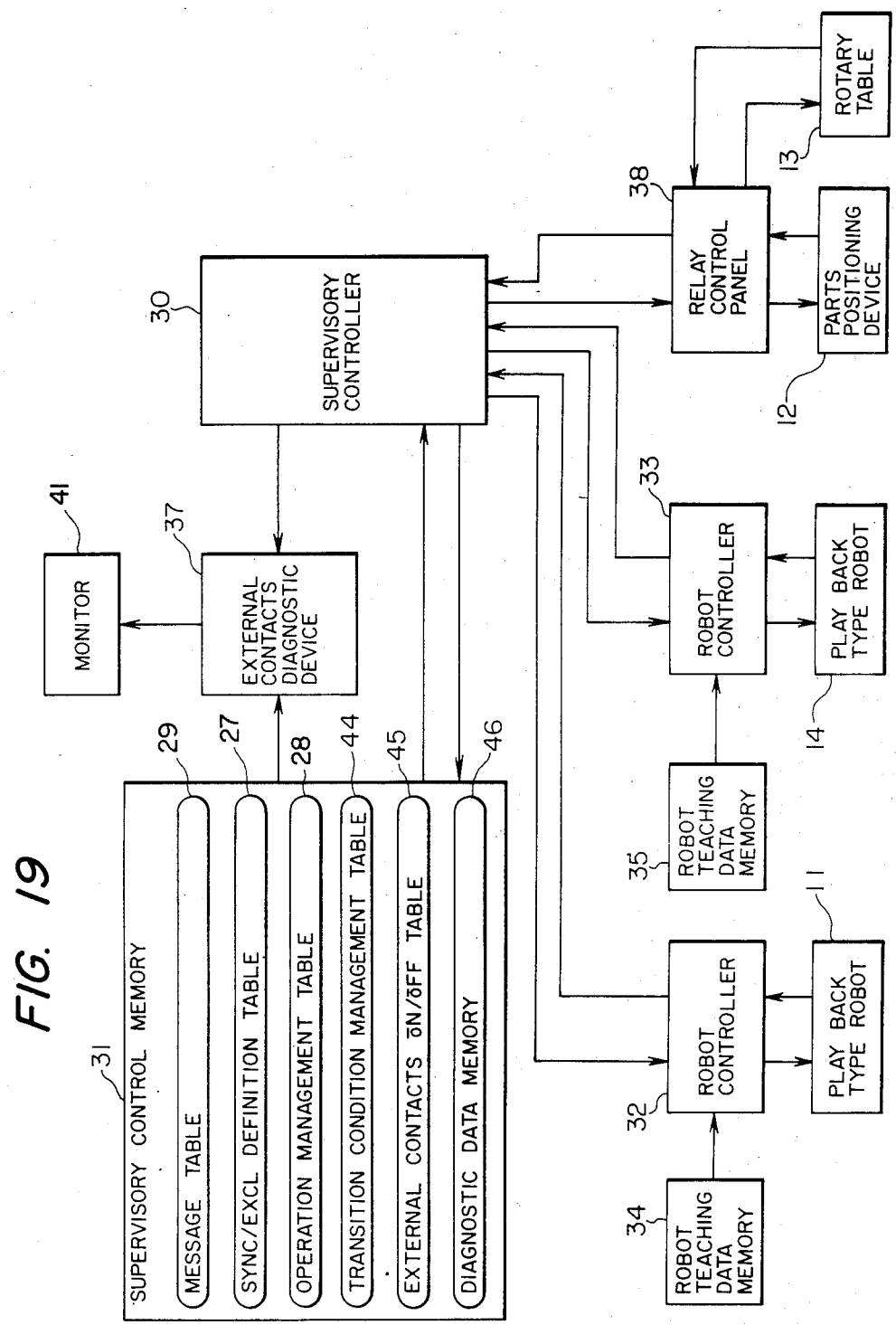
FIG. 19 is an overall block diagram of a third embodiment of the present invention.

FIG. 19 is a diagram of an embodiment relating to the third object of the present invention. In FIG. 19, the reference numeral 30 denotes the supervisory controller; 31, the supervisory control memory; 32 and 33, the robot control devices; 34 and 35, the robot operation teaching data memories; 41, the monitor terminal; 37, an external contacts diagnostic device; and 38, a relay control panel. In addition, the reference numerals 11 to 14 show the same component elements as those shown in FIG. 1; the reference numerals 27 to 29, 44 and 45 show tables for storing supervisory control information; and the reference numeral 46 shows a table for storing information for external contacts diagnosis.

First, the configurations of the tables 27 to 29 and 44 to 46 in the supervisory control memory 31 will be described. The table 27 is a sync/excl step definition table, in which a unit operation waiting for an interlocking signal for synchronous or exclusive control shown in FIG. 2 is registered, as well as a combination of interlocked unit operations are registered. FIG. 20 shows its specific contents.

Information concerning the execution of the unit operation of each machine tool indicated by the completion stand-by operation Nos. and the execute stand-by operation Nos. in FIG. 20 is stored in the operation management table 28 in the form shown in FIG. 21. In a case where all the unit operations of the completion stand-by operation Nos. registered in each sync/excl step have been completed, the unit operation of an execute stand-by operation No. is executed if a transition condition, which will be described later, is met.

In other words, the control information of the control message table 29 in FIG. 25, which is indicated by the message No. of a unit operation No., is set to the corresponding destination. Incidentally, the transition No. shown in FIG. 20 is a pointer indicating the transition condition registered in a transition condition management table 44 shown in FIG. 22.

In the operation management table 28 shown in FIG. 21, as for the execute management status, there is an execute standby status '0' and an execution completion status '1.' These execute management statuses are stored in the sync/excl step definition table 27 so as to indicate how far the moving sequence has proceeded. Correspondingly, the operation completion status '1' and the in-operation status '2' are recorded in the operation status 202.

In the transition condition management table 44 shown in FIG. 22, a transition condition expressed by a logic calculation formula with an external contacts No. as an operand is registered in the transition condition logic formula 203. Each numeral in the transition condition logic formula 203 expresses an external contacts No. For instance, a logic formula '11 AND 12' in transition No. 1 holds when external contacts No. 11 is ON and external contacts No. 12 is ON. The transition status 204 includes the transition condition '0' which has not been met and the transition condition '1' which has been met.

The ON/OFF state of each contact is stored in an external contacts ON/OFF information table 45 in the form shown in FIG. 23. In FIG. 23, the current external contacts status 205 includes the external contacts OFF '0' and the external contacts 'ON,' and manages in units of a block the ON/OFF information of such external contacts as the limit switches of each machine tool. In addition, a status monitoring flag 208 is used to store the change in the status of the aforementioned external contacts, and corresponds to a case in which the external contacts status has not changed '0' and a case in which the external contacts status has changed '1.

Control information sent by the supervisory controller 30 to each machine is registered in the control message table 29 in the form shown in FIG. 25, in correspondence with the operation Nos. executed by the supervisory controller 30 in accordance with the sync/excl step definition table 27 and the operation management table 28. In FIG. 25, an execute program '$i_n$,' an operation parameter No. '$j_n$,' and a relay ON/OFF pattern 'm' are registered in the control information 206.

The above are control data which are necessary in the supervisory controller 30. Incidentally, FIG. 24 shows an external contacts diagnostic table 46, in which information specifying either the execution and completion of a particular unit operation to which the change of the external contacts status to ON or OFF state is related, and the number of times of change in the status by that unit operation registered with respect to each external contact. In FIG. 24, the operation status corresponds to the time of execution '1' and the time of completion '2.'

Figure 26:
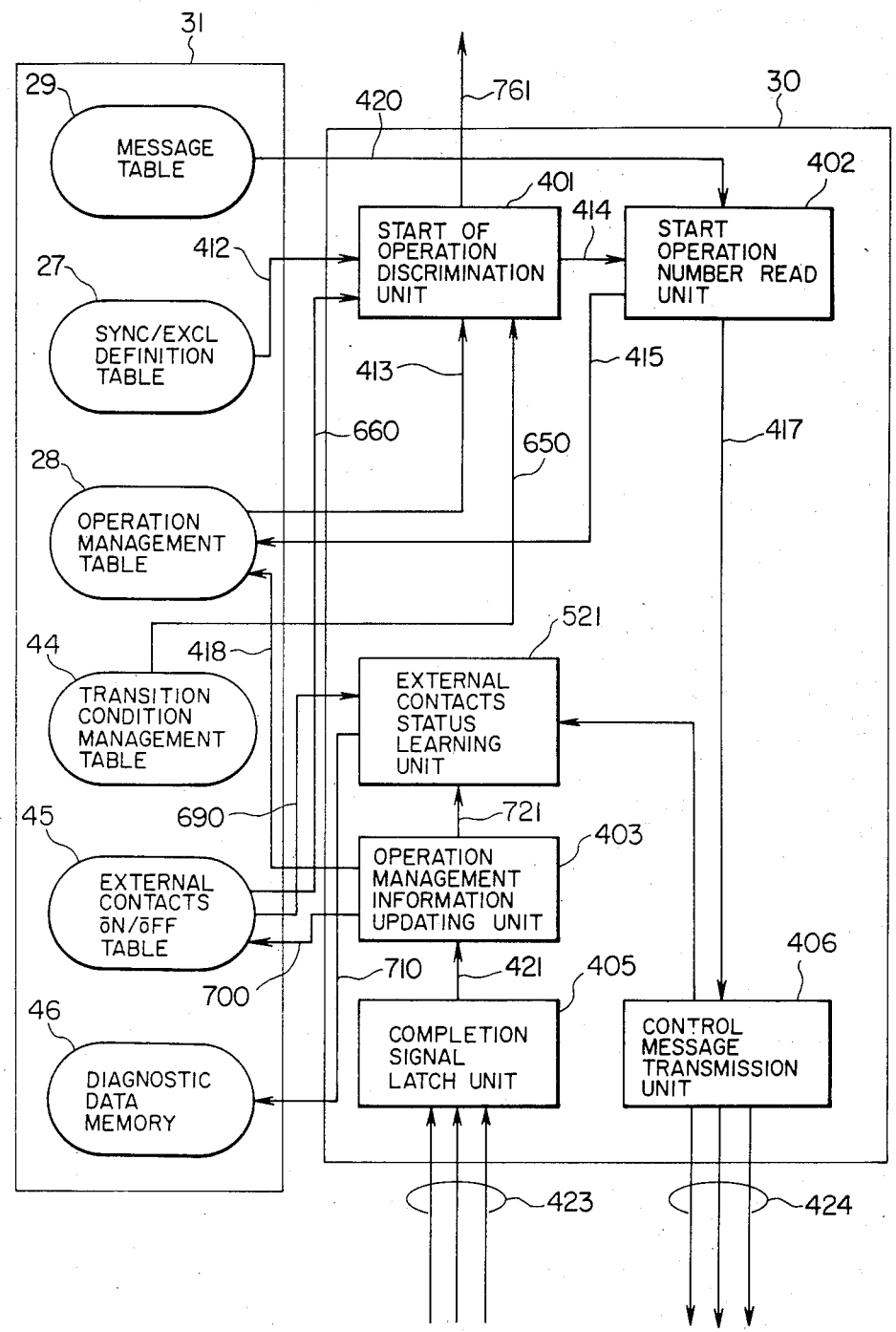
FIG. 26 is a block diagram of a supervisory controller related to the third embodiment.

FIG. 26 shows the configuration of the supervisory controller 30. In FIG. 26, the reference numeral 401 denotes an operation execution discriminating unit; 521, an external contacts status learning unit; 403, the operation management information updating unit; 402, the start operation number read unit; 405, the completion signal latch unit; and 406, the control message transmission unit.

The function of each of the aforementioned component elements will be described. The operation execution discriminating unit 401 reads out the completion stand-by operation No. and the execute stand-by operation No. as well as their execution management status 201 and operation status 202, from the sync/excl step definition table 27 and the operation management table 28 (412 and 413). In addition, the operation execution discriminating unit reads out the external contacts status 205 relating to the transition condition logic formula 203 corresponding to the transition No. of the sync/excl step definition table 27 (650 and 660).

Figure 27:
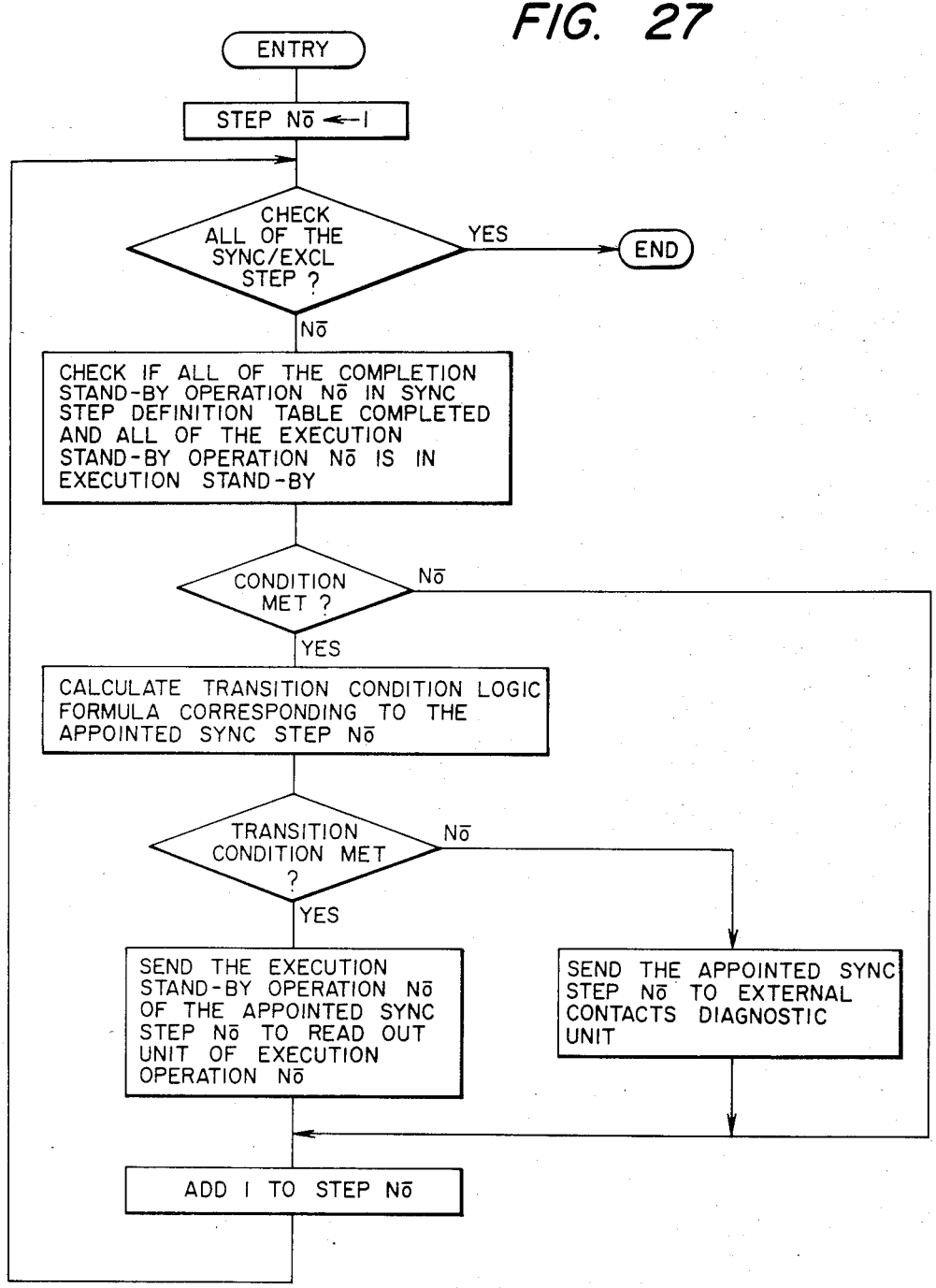
FIGS. 27, 28, and 30 are process flow charts.
Figure 28:
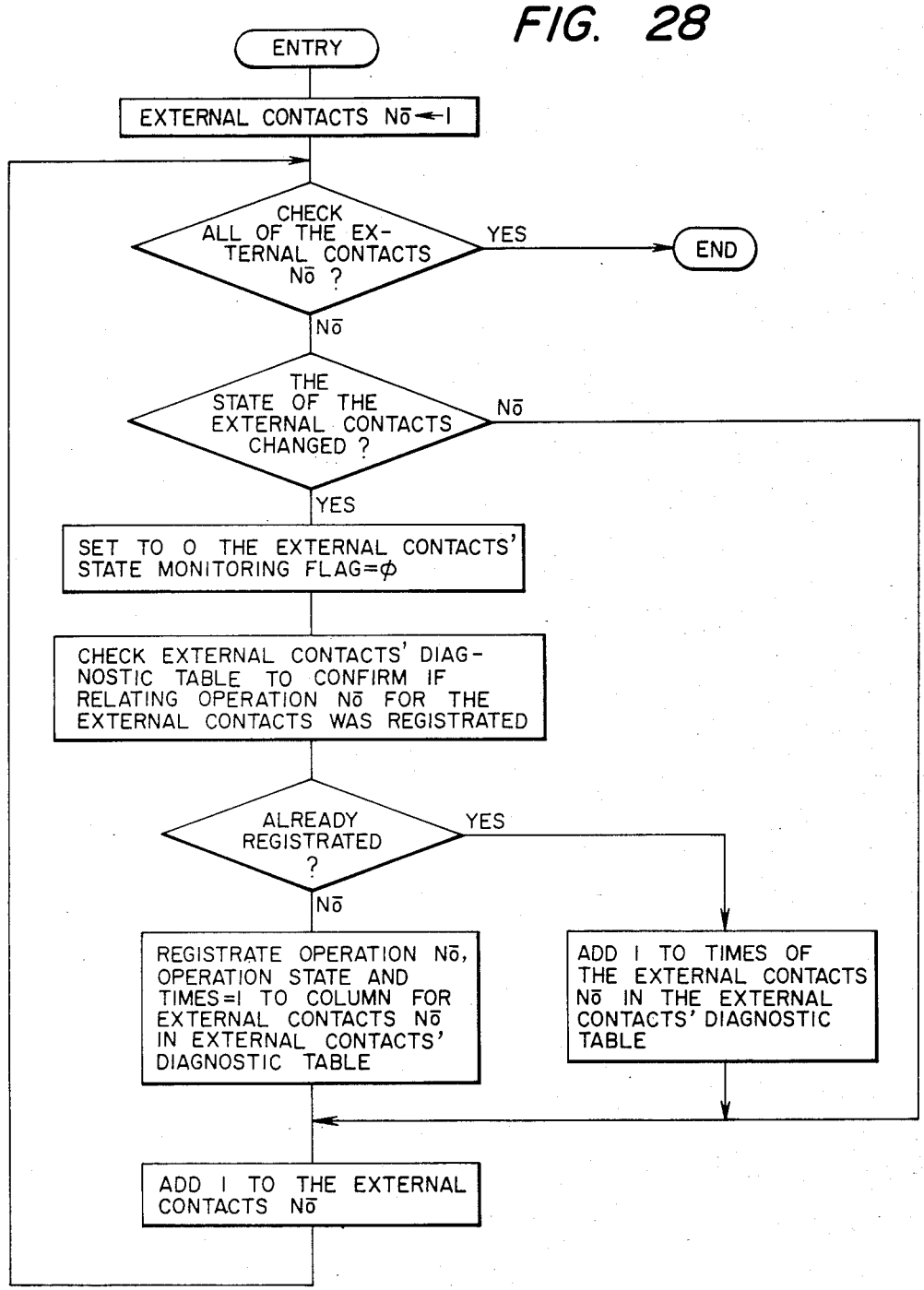

Next, the operation execution discriminating unit 401 selects a sync/excl step No. in which all of the unit operations of the completion stand-by operation No. have been completed and all the unit operations of the execute stand-by operation No. are on execute stand-by, and in which the transition condition has been met, and then sends the same to the execution operation number read out unit 402 (414), on the basis of the aforementioned data and in accordance with the flow chart shown in FIG. 27.

The execution operation number read out unit 402 reads out from the control message table 29 control information corresponding to the aforementioned execution stand-by No. sent from the operation execution discriminating unit 401 (420), and sends the same to the control message transmission unit 406 (417). Also, the control message transmission unit 406 sends said control information to the controller of a corresponding machine tool (424).

Each machine tool executes a unit operation corresponding to the aforementioned control information sent from the supervisory controller 30, and sends a completion signal to the completion signal latch unit 405 upon the completion of the execution of the unit operation (423). Completion signal latch unit 405, detecting the change from ON to OFF or from OFF to ON of the completion signal transmitted assynchronously from relay control panel 38, interrupts operation management information updating unit 403 and transmits the latched completion signal to the interrupted unit 403. The unit 403 recognized the No. and the ON/OFF state of external contacts based upon the received signal, and updates the state of the corresponding contact stored in external contacts ON/OFF table 45. The operation management information updating unit 403 updates the operation status of said operation No. from the in-operation to the operation-completed status (421).

Each time when the external contacts status learning unit 521 receives each completion signal or transmits the execution signal of an operation, the external contacts status learning unit 521 checks the external contacts ON/OFF information table 45, and finds external contacts in which the status has changed due to the execution or completion of a unit operation (690). Then, the external contacts status learning unit 521 stores in the external contacts diagnostic table 46 the execution or completion of a unit operation relating to the change in the status of the external contacts, as well as the number of times of change effected by that unit operation (710).

Furthermore, when each sync/excl step No. is checked at the operation execution discriminating unit 401 in accordance with the flow chart shown in FIG. 27, and when there is a sync/excl step in which only the transition condition is not met, said sync/excl step No. is sent to the external contacts diagnostic device 37 (761).

Figure 29:
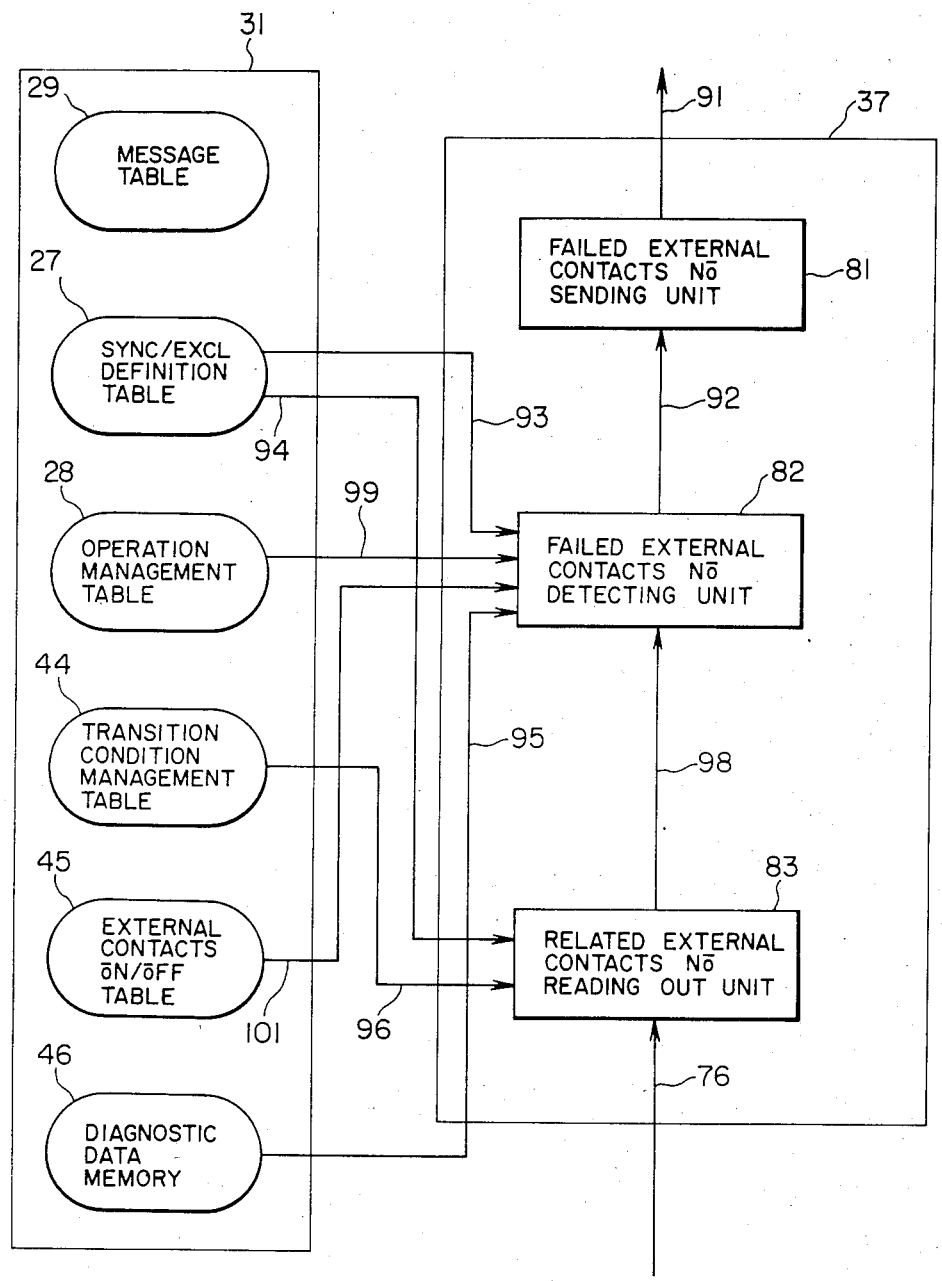
FIG. 29 is a block diagram illustrating an external contacts diagnostic unit.

The external contacts diagnostic device 37 has the configuration shown in FIG. 29. A related external contacts read out unit 83 reads out from the sync/excl step definition table 27 the transmission No. indicated by the sync/excl step No. sent from the supervisory controller 30 (94), and reads out a transition condition logic formula indicated by the transition No. from the transition condition management table 44 (96). Then, the external contacts diagnostic device 37 sends an external contacts No. constructing the logic formula to a failed external contacts No. detecting unit 82 (98).

Figure 30:
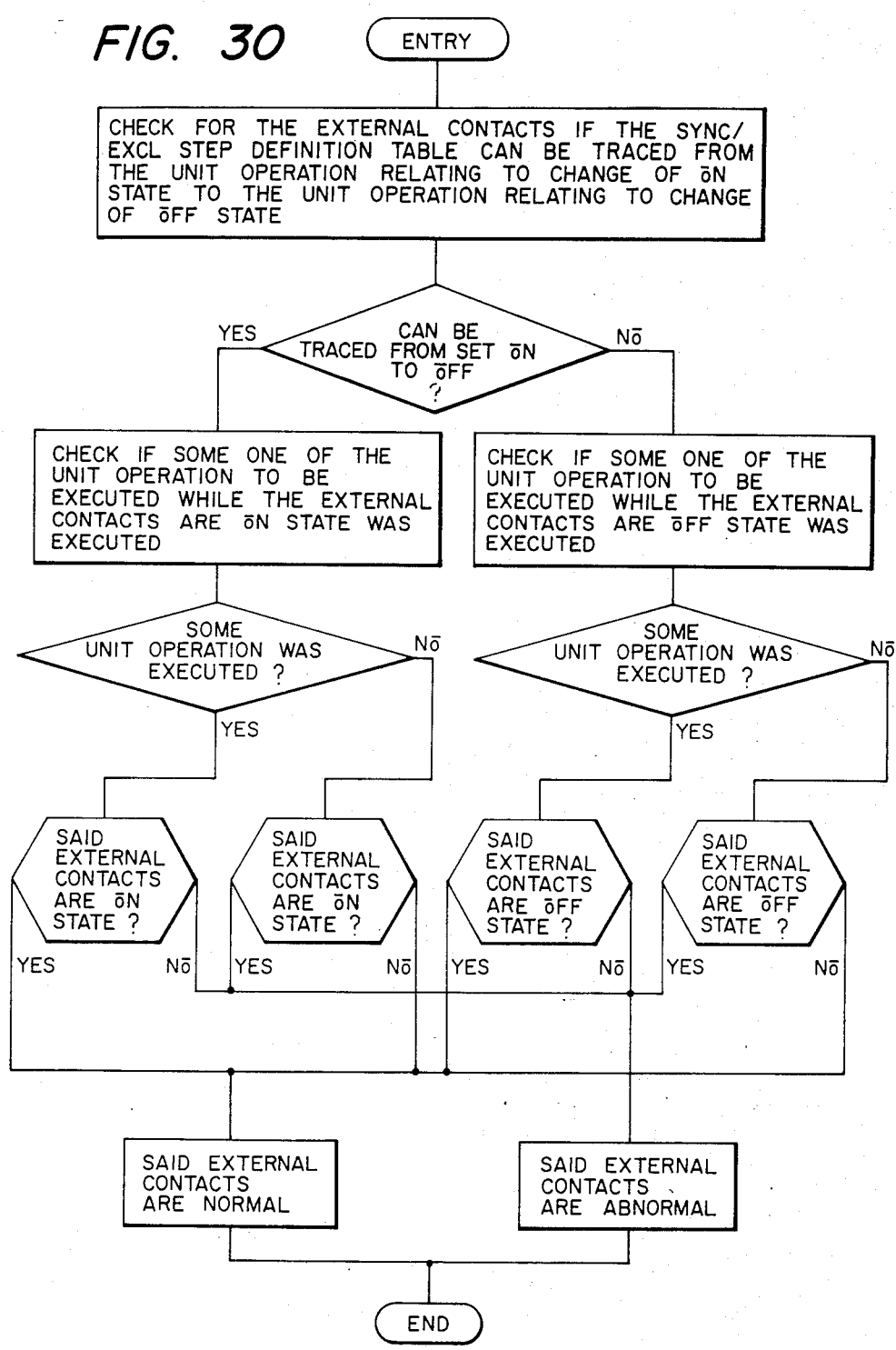

The failed external contacts No. detecting unit 82 judges whether or not the external contact has failed with respect to the external contact having the external contacts No. sent from a related external contacts No. read out unit 83 in accordance with the flow chart shown in FIG. 30. In other words, of the unit operations relating to the change from the external contacts diagnostic table 46 stored during the time of normal state to the ON state of said external contact, the unit operation which has the largest number of times, as well as the most frequent unit operation and the status of the respective unit operations (completion or execute) of the unit operations relating to the change to the OFF state of said external contacts are read out (95), and judgment is made from them and the unit operations presently in the executed state as to whether said external contacts are in the ON state or OFF state.

Now, assuming that there is no repetition of what would be utterly the same operation in a given series of the sequence, when it is possible to trace the sync/excl step definition table from the unit operation relating to the change to the ON state to the unit operation relating to the OFF state with respect to said external contacts, said external contacts are in the ON state during the period from the execution or completion of the unit operation relating to the change to the ON state to the execution or completion of the unit operation relating to the change to the OFF state, and should be in the OFF state in other sections.

Meanwhile, in a case where it is not possible to trace the sync/excl step definition table 27 from the unit operation relating to the change to the ON state to the unit operation relating to the change to the OFF state, said external contacts should be in the OFF state until the time when the unit operation relating to the change to the OFF state has been executed or completed, and should be in the ON state in other sections.

For instance, in the case of the sync/excl step 1, its transition No. is 1 (refer to FIG. 20), and its transition condition logic formula is "11 AND 12" (refer to FIG. 22). Said external contacts No. 11 changes to the ON state at the time when the unit operation 112 is completed due to the external contacts diagnostic table 46, and changes to the OFF state when the unit operation 118 has been executed. Since it is possible to trace the sync/excl step definition table 27 from the unit operation 112 to the unit operation 118, the external contact No. 11 should be in the ON state during the time from the completion of the unit operation 112 until the execution of the unit operation 118. If the external contacts No. is in the OFF state even though the unit operation 113 has been executed, it is judged that the external contacts No. 11 is abnormal (faulty).

The external contacts No. in relation to which the abnormality has been detected is sent to the failed external contacts No. sending unit 81 (92), and the failed external contacts No. sending unit 81 converts this transmitted external contacts No. into the output format for the monitor display and sends it to the monitor terminal 41 (91). The external contacts diagnostic device 37 judges from the data stored during the normal state whether said external contact (No. 11) should be in the ON or OFF status in the given situation, and detects the failed external contact automatically.

According to this embodiment, it is possible to effectively detect the failure of an external contact by detecting a sync/excl step in which the transition condition alone is not met while the moving sequence is being executed and by detecting the failure only with respect to the external contact relating to that sync/excl step. In addition, it is possible to detect an external contact that has failed on the basis of the information learned during the normal state without preparing failure diagnostic data separate from the control data.

Furthermore, it goes without saying that although in the aforementioned embodiment the supervisory controller 30 and the external contacts diagnostic device 37 are provided separately, it is possible to integrate them into one device.

Moreover, it also goes without saying that the forms of each supervisory control information table 27 to 29, 44 and 45 and the external contacts diagnostic table 46 stored in the supervisory control memory 31 should not be confined to the ones shown in the aforementioned embodiment.

According to the present invention, when an abnormality has occurred in a workstation and each machine tool has stopped as a result, it is possible to automatically set the internal condition of a control data table necessary for restarting the workstation only by appointing a unit operation for restarting the work, and it is possible to reduce the amount of labor required in the restart.

Furthermore, in an automatic machine tool or the like in which a large number of such contacts as limit switches are used, at the time when the failure of said limit switches and the like is detected, since information as to the manner in which each limit switch and the like change to the ON or OFF state at the time of execution of a unit operation is stored, and since the failure of contacts such as said limit switches and the like are detected on the basis of that data, it is possible to simply and positively detect failure of the limit switches and so on.

What is claimed is:

1. A method of controlling machine tools in which a series of operations in a sequence is executed by a combination of synchronous control and exclusive control with respect to unit operations programmed in advance and in which said unit operations are subject to possible abnormality, wherein the method of recovering normality of the series of movements following abnormality, comprises a first storing of data indicating the relationship in the sequence of the execution of each unit operation to the execution of other unit operations to be controlled synchronously or exclusively, said data including information on a series of steps specifying the correspondence between at least one execute stand-by unit operation number and at least one completion stand-by unit operation number; a second storing of information relating to the operational status of each unit operation, said information including information on operation management indicating the execution management status and operation status of each unit operation; a third storing of operation instructions for executing each unit operation; and when machine tools have stopped due to the occurrence of an abnormality while a series of unit operations are being executed by the operational instruction stored by said third storing, appointing a unit operation for restarting on the basis of the relationship of the sequence of execution of the unit operations stored by said first storing and correcting information concerning the operational status stored by said second storing by following a reverse sequence to a normal status with reference to said data stored by said first storing.

2. A method of recovering normality according to claim 1, wherein, at the time when a junction operation in which there exist two or more sequences of operations leading to a unit operation has been executed, further including a fourth storing of the steps of the executing sequence relating to that execution, and when an abnormality has occurred while a unit operation is being executed, a reverse sequence is followed by referring to the relationship of the sequence of execution of each unit operation and by appointing a desired unit operation for restarting, and when there exist two or more reverse sequences of operations in the course of the operation of the machine tools, the content of the information stored by said second storing is corrected by the information stored during said fourth storing to a state permitting restarting from said appointed unit operation.

3. A method of recovering normality according to claim 2, further including a fifth storing of information indicating whether or not a unit operation is a junction operation, and when a junction operation is executed during the normal state of the execution of the sequence, the sequence of steps relating to that execution and the junction operation are stored by said fourth storing.

4. In an automated apparatus controlled by a series of operations in a sequence including synchronous and exclusive operations by a combination of unit operations taught or programmed in advance and having a plurality of external contacts, the state of which indicates the result of said operations, an apparatus for recovering the operation after an abnormality has occurred in a unit operation of the sequence, comprising:
first storing means for storing data indicating the relationship in the sequence execution of each unit operation to the execution of other unit operations to be controlled synchronously or exclusively;
second storing means for storing the operational status of said unit operations based on the state of said external contacts;
third storing means for storing a unit operation relating to the change of the state of said external contacts while executing said sequence of operations and
means for determining the state of said external contacts from the information stored in said third storing means as well as the present operational condition of each machine tool during the execution of said sequence of operations.

* * * * *